US012455893B2

(12) United States Patent
Van de Walle et al.

(10) Patent No.: US 12,455,893 B2
(45) Date of Patent: Oct. 28, 2025

(54) AUTOMATED DEPENDENCY GRAPH BUILDER SYSTEM AND NETWORK MANAGEMENT

(71) Applicant: T-Mobile USA, Inc., Bellevue, WA (US)

(72) Inventors: Joshua Van de Walle, Bellevue, WA (US); Emile Minh Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 189 days.

(21) Appl. No.: 18/195,931

(22) Filed: May 10, 2023

(65) Prior Publication Data

US 2024/0378214 A1 Nov. 14, 2024

(51) Int. Cl.
*G06F 16/00* (2019.01)
*G06F 16/25* (2019.01)
*G06F 16/27* (2019.01)

(52) U.S. Cl.
CPC ............ *G06F 16/252* (2019.01); *G06F 16/27* (2019.01)

(58) Field of Classification Search
CPC ............................. G06F 16/252; G06F 16/27
See application file for complete search history.

(56) References Cited

U.S. PATENT DOCUMENTS

| 2014/0337282 | A1* | 11/2014 | Mesika ................... G06F 16/21 707/609 |
| 2017/0103100 | A1* | 4/2017 | Sharma ............... G06F 11/1448 |
| 2023/0077577 | A1* | 3/2023 | Zhong ................. G06F 11/3452 714/38.1 |
| 2023/0188408 | A1* | 6/2023 | Pick .................... H04L 41/0627 709/224 |
| 2023/0367619 | A1* | 11/2023 | Dechu ................... G06F 40/268 |
| 2024/0005268 | A1* | 1/2024 | Hall ..................... G06Q 10/087 |
| 2024/0231897 | A1* | 7/2024 | Vigliotti ................ G06F 9/4881 |

* cited by examiner

Primary Examiner — Dinku W Gebresenbet
(74) Attorney, Agent, or Firm — Lee & Hayes, P.C.

(57) ABSTRACT

An automated dependency graph builder system builds a dependency graph for managing a network. The automated dependency graph builder system and network management can utilize networks (e.g., telecommunication networks) and/or systems for providing, and/or being communicatively connected with, the telecommunication networks. The automated dependency graph builder system and network management can execute a script orchestration engine to sort database scripts, and execute database scripts according to script execution orchestrator information.

19 Claims, 4 Drawing Sheets

AUTOMATED DEPENDENCY GRAPH BUILDER SYSTEM AND NETWORK MANAGEMENT

BACKGROUND

Systems and networks utilize hardware and software resources to obtain data, maintain databases, perform computerized data analysis, generate automated reports, and perform system and network updates, modifications, and corrective actions. Computing devices manage data associated with the systems and networks. The computing devices include source devices that generate and provide data and servers that utilize the data received from the source devices. The servers execute scripts to process the data. The scripts being executed by the servers to process the data are utilized to generate processed data and store the processed data.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
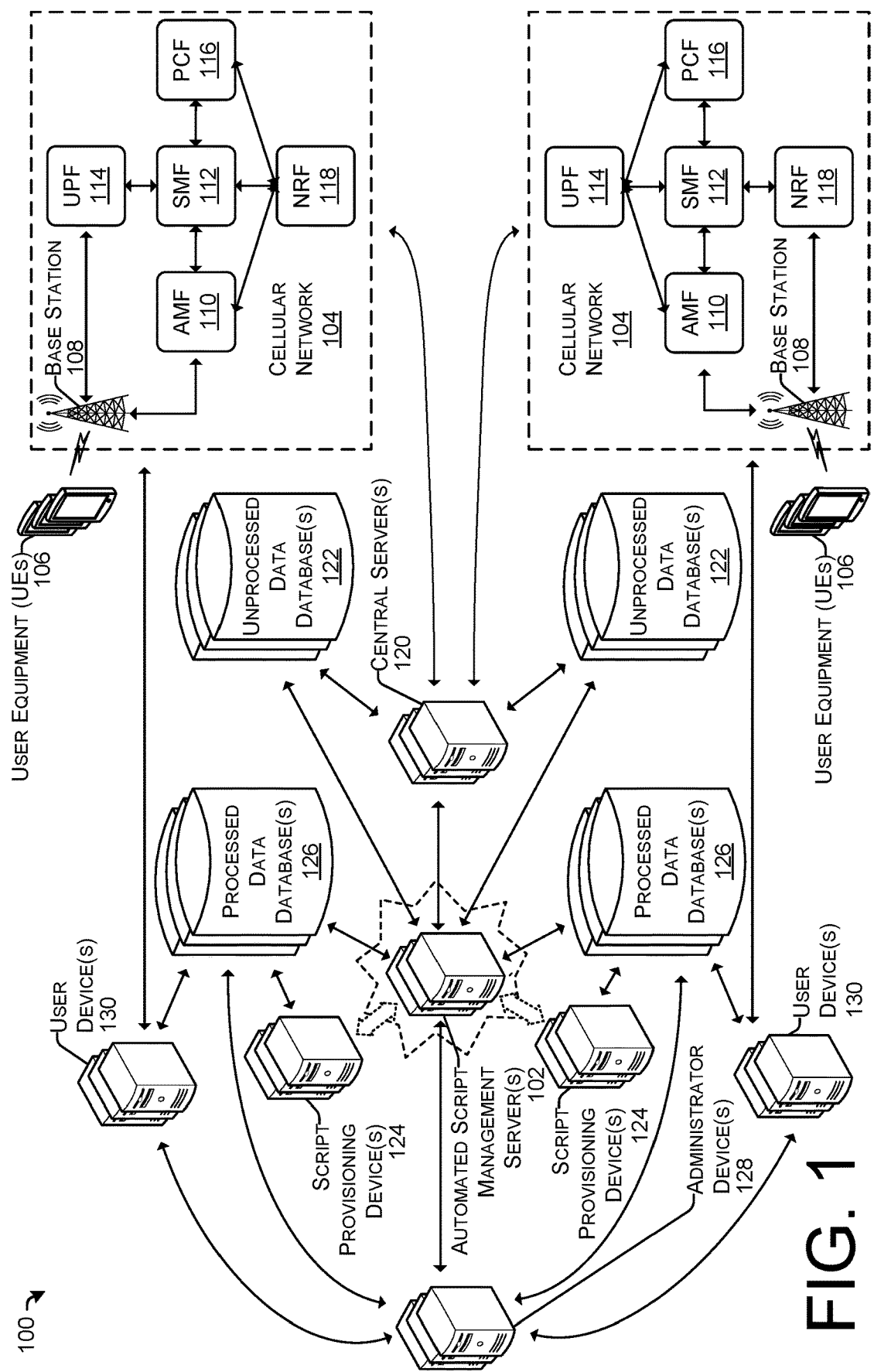
FIG. 1 schematically illustrates an example environment for obtaining and analyzing unprocessed data, storing the unprocessed data in databases, executing database scripts to manipulate, analyze, and load the database data into the databases, and performing actions therewith.

This disclosure is directed to techniques for automated dependency graph and network management. The techniques can be implemented utilizing telecommunication networks, systems associated with the telecommunication networks, methods therefor, other systems, and/or other methods therefor, the other systems being included within, integrated with, and/or communicatively coupled to, the systems associated with the telecommunication networks.

Servers included in the systems can identify and retrieve data, which can include unprocessed data. The unprocessed data can be associated with the systems and/or with networks, which can include telecommunication networks. The servers can manage databases, which can include unprocessed data databases, to store the unprocessed data. The servers can retrieve, from the unprocessed data databases, the unprocessed data, which can be associated with network devices in the telecommunication networks. The network devices can include network nodes and/or other network devices of various types.

The servers, which can manage database management scripts, script execution information, and script execution orchestrator programs, can receive and analyze the database management scripts. The servers can be communicatively coupled to devices, which can include script provisioning devices. The servers can receive the database management scripts from the script provisioning devices. The servers can analyze groups of the database management scripts being related to one another. The servers can identify the script execution information and the database management scripts being analyzed. The script execution information can include order information, priority information, dependency information, status information, availability information, any other type of execution information, or any combination thereof.

The servers can utilize the script execution information to execute the database management scripts and to generate processed data. The servers, which can process the script execution information and execute the database management scripts, can analyze the unprocessed data, generate processed data, and store the processed data. The databases managed by the servers can include processed data databases. The servers can store the processed data in the processed data databases.

The servers can retrieve, from the processed data databases, the processed data, which can be utilized to generate reports. The servers, being communicatively coupled to the devices, which can include user devices, can transmit the processed data to the user devices. The user devices, which can be utilized to manage the processed data, can analyze the processed data and generate the reports. The reports, which can be managed by the user devices to perform various actions, can be utilized to transmit messages, output signals, present notifications, manage the network devices, or perform any other types of actions, or any combination thereof.

As noted above, utilizing script execution information and script execution orchestrator programs to manage execution of database management scripts and operation of systems and networks has many technical benefits. Firstly, it reduces extraneous network traffic, thereby conserving network bandwidth in networks (e.g., the telecommunication networks). Networks from which data is obtained can operate more effectively according to the techniques discussed herein than in conventional networks that often supply data that is improperly or incompletely analyzed due to problems in execution of database scrips.

The networks being operated utilizing conventional technologies are frequently required to resupply data that was previously supplied or to supply updated data due to changes having taken place in the network since the previously supplied data was captured. These disadvantages associated with existing systems and networks may result from updates or modifications to database scripts for various reasons that cause execution of other database scripts to malfunction. Malfunctions of database scripts reduce the effectiveness of the existing systems and networks that subsequently extract data from the networks again, and then rerun the database scripts or run different database scripts.

The systems and networks being operated according to the techniques discussed herein do not experience the above-mentioned setbacks associated with conventional technologies. In particular, by utilizing the techniques discussed herein, the script execution orchestrator programs ensure correct execution of the database management scripts. Unprocessed data being extracted from the networks is reliably analyzed and utilized to produce processed data. The reliable analysis of the unprocessed data does not result in the delays of the existing systems that otherwise require duplicate extractions of unprocessed data or subsequent extractions of up-to-date unprocessed data.

That is, the script execution orchestrator programs can be utilized to conserve network resources associated with networks from which data is being collected. By decreasing redundant or duplicate communications utilized to collect data for execution of the database management scripts, network resources including throughput, connectivity, and bandwidth, can be increased, and network latency and packet loss rate can be decreased.

Other network resources associated with subsequent operation of networks being updated based on processed data output via execution of the database management scripts utilizing the script execution orchestrator programs are also improved with respect to conventional technologies. Resolution of problems in existing systems and networks is often impaired or delayed by improper execution of database management scripts. Certain database management scripts that are modified or updated may cause malfunctions in other database management scripts, which impairs generation of processed data and subsequent repairs, updates, or modifications being made to networks based on the processed data.

On the contrary, the systems and networks being operated according to the techniques discussed herein improve efficiency, robustness, and reliability of networks being operated based on report data generated by execution of the database management scripts according to the script execution orchestrator information. The script execution orchestrator programs being executed result in efficient and timely generation of report data, which in turn results in automated upgrades to networks being performed earlier and more accurately than in existing systems and networks. Systems and networks being managed based on modifications, upgrades, and/or updates performed utilizing the script execution orchestrator programs according to the techniques discussed herein experience higher data throughput, connectivity, and bandwidth, and lower network latency and packet loss rates, than in existing systems and networks.

Secondly, the benefits resulting from operations performed according to the techniques discussed herein include effective and improved utilization of compute resources. In existing systems, systems processors are often utilized to perform portions of instructions utilized for execution of database management scripts. The processing not successfully completed, however, for instances in which some database management scripts are changed, or orders in which the database management scripts are executed are changed, thereby effecting execution of other database management scripts. Execution of the database management scripts relying on original or older versions of other database management scripts is interrupted due to dependencies of the database management scripts. As a result of the interruptions, the system processors are subsequently inefficiently utilized for database managements script execution after errors are resolved.

On the contrary, compute resources of the systems and networks being operated according to the techniques discussed herein are conserved for other purposes. By efficiently and effectively executing database management scripts, including continual execution of the database management scripts according to dynamic updates to the script execution orchestrator information and the script execution orchestrator programs, the database management scripts can be executed without errors. Efficiently executing the database management scripts frees up compute resources and enables other execution of the database management scripts to be performed more quickly reliably.

Compute resources of the network devices in the networks from which the unprocessed data is obtained, and in the networks being operated according to the reports, are also utilized more effectively than in existing networks. The script execution orchestrator programs according to the techniques discussed herein result in fewer errors occurring from execution of the database management scripts. By decreasing numbers of the errors and increasing successful execution of the database management scripts, the network devices are able to be updated more quickly and with less delay, thereby enabling the network devices to be operated utilizing the most efficient and up-to-date software and configuration parameters.

Furthermore, management of memory resources of the systems and the network devices is improved according to the techniques discussed herein. Storage devices of existing systems and network devices track large amounts of data used for troubleshooting problems, as a result of delayed or unsuccessful updates to the systems and devices. Data is also stored, according to conventional technologies, less effectively due to problems experienced in performing system and network updates, modifications, and upgrades. Relatively large amounts of data are also stored in storage devices of computing devices associated with the systems and the networks for presenting relevant information to users via displays of the computing devices, in order to resolve errors.

On the contrary, memory resources of systems and network devices being managed according to the techniques discussed herein are able to be reallocated for other purposes based on successful execution of database management scripts. Data being preserved for the execution of database management scripts can be replaced by other data, following performance of updates, modifications, and upgrades to systems and networks based on reports generated utilizing execution of database management scripts utilizing the script execution orchestrator programs. The database management scripts can be executed according to the techniques discussed herein relatively efficiently to avoid the unnecessary storage of the above-mentions data of various types as is often required in systems and networks being operated according to conventional technology.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

Illustrative Systems for Automated Dependency Graph Builder System and Network Management FIG. 1 schematically illustrates an example environment 100 for obtaining and analyzing unprocessed data, storing the unprocessed data in databases, executing database scripts to manipulate, analyze, and load the database data into the databases, and performing actions therewith, in accordance with some examples of the present disclosure. The environment 100 can include one or more automated script management servers 102, which can manage (e.g., perform automated management) one or more scripts (e.g., one or more database scripts) (e.g., one or more extract, transform, load (ETL) scripts) to process data (or "unprocessed data") (e.g., data having not yet been processed by the automated script management server(s) 102, as discussed below in further detail) and generate data (e.g., processed data, report data, etc.) as output of the script(s).

In various implementations, various types of output data (e.g., the processed data, the report data, etc.) being generated, based on orchestration (e.g., automated orchestration of script execution, as discussed below in further detail) of the script(s) performed via the automated script management server(s) 102, and based on execution of the script(s), can be utilized in various ways. For example, output data being generated, based on the orchestration performed by the automated script management server(s) 102, and based on the execution of the script(s), can be utilized to manage one or more systems, manage one or more networks, perform any of one or more types of one or more other actions, or any combination thereof.

Although the output data generated via the automated script management server(s) 102 can be utilized for system management, network management, performance of various actions, etc., as discussed above in the current disclosure, it is not limited as such. In some examples, the output data generated via the automated script management server(s) 102 can be utilized in any other ways and for any other purposes (e.g., the output data can be utilized by various devices operated by administrators, operators, users, third-parties, etc., for performing various actions, as discussed below in further detail).

The script(s) and/or the data being managed by the automated script management server(s) 102 can include various types of script(s) and/or various types of data, respectively. The script(s) being managed by the automated script management server(s) 102 can include, for example, at least one script (e.g., at least one database script, as discussed in further detail below) being utilized to manage various types of data, at least one other script of any other type, or any combination thereof.

In various examples, the various types of data (e.g., the unprocessed data) being utilized for operation of the automated script management server(s) 102 can include data (or "managed data") being managed by the automated script management server(s) 102. In those or other examples, the data being utilized for operation of the automated script management server(s) 102 can include the managed data, other data (or "initial data") (e.g., data being identified, captured, generated, and/or stored, and utilized to identify, capture, generate, and/or store the managed data), or any combination thereof (e.g., data being both the initial data and the managed data, with a partial or an entire portion of the initial data being the same as, or different from, a partial or an entire portion of the managed data).

The various types of data (e.g., the initial data, the managed data, any other data, or any combination thereof) being utilized for operation of the automated script management server(s) 102 can include data (e.g., network data) associated with one or more wireless networks (e.g., one or more cellular networks). For ease of explanation, any of the various types of data (e.g., the initial data, the managed data, any other data, or any combination thereof) being utilized for operation of the automated script management server(s) 102 and being associated with the network(s) (e.g., the wireless networks, the cellular networks, etc.) may be referred to simply as network data, wireless data, wireless network data, cellular data, etc., throughout the disclosure.

In some examples, the initial data can include raw data (or "source data") being generated and/or captured by the network(s) and being unmodified (e.g., not being modified, altered, or changed in various ways (e.g., not being modified, altered, or changed in any way)). In those or other examples, at least a portion of the initial data can include raw data being generated by one or more devices (or "source device(s)") (e.g., the network nodes, as discussed below in further detail) of the network(s).

In various examples, the environment 100 can include the wireless networks, which can include one or more cellular networks 104. In those or other examples, the network data can include cellular data associated with the cellular network(s) 104, other cellular data associated one or more other cellular networks, or a combination thereof.

The cellular network(s) 104, which can include one or more network devices (e.g., one or more network nodes) (e.g., one or more network functions and/or one or more devices being utilized to implement the network nodes), can be utilized to provide one or more wireless services for one or more user equipment (UE(s)) 106, via one or more base stations (e.g., gNodeBs) (or "gNBs") 108.

At least one of individual ones of the cellular network(s) 104 can include the network node(s) of various network node types. For example, the network node(s) can include the base station(s) 108, one or more access and mobility management functions (AMFs) 110, one or more session management functions (SMFs) 112, one or more user plane functions (UPFs) 114, one or more policy control functions (PCFs) 116, one or more network repository functions (NRFs) 118, etc.

In various examples, a base station 108 can include a Wi-Fi access point or other access point that can be connected to a core network of a cellular network 104 through the internet or another type of connection. The base station 108 can receive an attach request from a UE 106, when the UE 106 connects to the base station 108. The attach request, which can be transmitted by the UE 106, can be routed via the base station 108 to a management element (e.g., an AMF 110, an SMF 112, etc.) of the core network.

In various implementations, the AMF 110 can be configured to receive one or more requests (e.g., a service request, such as the attach request, a session management request, etc.) from the UE 106. For example, the AMF 110 can forward a request to the SMF 112 selected by the AMF 110. The request, for example, can be utilized by the SMF 112 to initiate a new session (e.g., a protocol data unit (PDU) session) for the UE 106.

In various examples, an NRF 118 can perform registration and discovery of various 5G network services, either in a local network (e.g., the cellular network 104 to which the UE 106 is connected) or a remote network. The NRF 118 can provide, to the AMF 110, information indicating which of the SMFs 112 are suitable to handle the requests, such as the SMF 112 to be selected by the AMF 110 to receive the request.

In various examples, the SMF 112 can retrieve policy and subscription information based on information provided by the NRF 118. The SMF 112 can periodically obtain proxy-call session control function (P-CSCF) availability and/or loading information from the NRF 118. The SMF 112 can create, update, and/or remove the PDU session, and/or manage session context with the UPF 114. The SMF 112 can transmit, to the UE 106, an IP address of a selected P-CSCF.

In various examples, the PCF 116 can communicate with the AMF 110 and the SMF 112 to provide various types of information. The PCF 116 can provide access and mobility policies to the AMF 110 in order to trigger policy rules on the UE 106 or user-sessions. The PCF 116 can provide the policy and subscription information (e.g., session management policies, network slicing information, roaming, information, and mobility management information, etc.) to the SMF 112 (e.g., the PCF 116 can provision policy and charging control decisions on the SMF 112). The PCF 116 can maintain policy and charging control (PCC) policies corresponding to attributes of communication session types, service types, subscriber or account types, quality of service (QoS) levels, and/or any other attributes, and/or can implement a front end to access subscription information relevant for policy decisions in a data repository.

Although any of at least one cellular network of the cellular network(s) 104 and any of the network node(s) (e.g., any of the base station(s) 108, any of the AMFs 110, any of the SMFs 112, any of UPFs 114, any of the PCFs 116, any of the NRFs 118, and any of at least one other network node of any type, or any combination thereof) can be associated with fifth generation (5G) cellular technology, as discussed above in the current disclosure, it is not limited as such. At least one of the cellular network(s) 104 and at least one of the network node(s) can be associated with any type of cellular technology (e.g., long term evolution (LTE) technology, third generation (3G) technology, etc.), and can be utilized in a similar way as the at least one 5G cellular network, and/or the network node(s) of the at least one 5G cellular network, respectively, to implement any techniques as discussed herein. In some examples, the environment 100 can include or more other networks of various types (e.g., one or more non-cellular networks) communicatively coupled to, or with, any of the device(s) and/or network(s) of the environment 100.

In some examples, the data being utilized for operation of the automated script management server(s) 102 can include the data (e.g., the network data, which can be associated with the cellular network(s) 104) being managed (e.g., processed, modified, stored, etc.), prior to the data being utilized by the automated script management server(s) 102, in various ways and/or by one or more of various types of devices of the environment 100. In those or other examples, the environment 100 can include one or more central servers 120 and one or more unprocessed data databases 122.

In some implementations, individual ones of the cellular network(s) 104 can identify, capture, generate, and/or transmit the unprocessed data to be stored via, for example, at least one of the unprocessed data database(s) 122. In various examples, transmitting of the unprocessed data can include transmitting, by the cellular network(s) 104, the unprocessed data to at least one of the automated script management server(s) 102, at least one of the unprocessed data database(s) 122, at least one of the central server(s) 120, at least one of any other device of the environment 100, or any combination thereof.

In some examples, the unprocessed data can be loaded into, and/or stored via, the unprocessed data database(s) 122. In those or other examples, the unprocessed data can be loaded into, and/or stored via, the unprocessed data database(s) 122 based on execution of computing software by one or more devices (e.g., at least one of the automated script management server(s) 102, at least one administrator device (e.g., at least one of the administrator device(s) 128, as discussed below in further detail), at least one user device (e.g., at least one of the user device(s) 130, as discussed below in further detail), at least one of any other type of device, or any combination thereof) of the environment 100.

In some examples, the central server(s) 120 can obtain, retrieve (e.g., retrieve via a transmitted unprocessed data request based on a received message indicating unprocessed data availability) (e.g., retrieve via transmission of at least one request, with or without receiving a prior notification message), and/or receive (e.g., receive without receiving any prior message associated with unprocessed data availability) the unprocessed data (e.g., the unprocessed data being provided, and/or transmitted by, the cellular network(s) 104). In those or other examples, the central server(s) 120 perform storing of the unprocessed data via the unprocessed data database(s) 122. In those and other examples, the unprocessed data database(s) 122, which can be utilized to store the unprocessed data associated with the cellular network(s) 104, can be utilized to provide the unprocessed data to the central server(s) 120 to be routed to automated script management server(s) 102.

In some examples, unprocessed data can be transmitted by the cellular network(s) 104 in real-time. For example, the cellular network(s) 104 (e.g., at least one of the network node(s) in the cellular network(s) 104) can dynamically transmit the unprocessed data automatically (e.g., via an automated process). The automated process including the cellular network(s) 104 (e.g., at least one of the network node(s) in the cellular network(s) 104) dynamically transmitting the unprocessed data can include the cellular network(s) 104 (e.g., at least one of the network node(s) in the cellular network(s) 104) automatically transmitting the unprocessed data to be stored via the unprocessed data database(s) 122. The automatic transmitting of the unprocessed data can include the data being transmitted automatically based on the data being identified, captured, and/or generated by the cellular network(s) 104 (e.g., at least one of the network node(s)).

In additional or alternative examples, the cellular network(s) 104 (e.g., at least one of the network node(s)) can transmit unprocessed data to be stored via the unprocessed data database(s) 122 based on scheduling information (e.g., scheduling information being stored and utilized by the cellular network(s) 104 (e.g., at least one of the network node(s))). Automated transmission being scheduled for the unprocessed data can include at least a portion of the unprocessed data being transmitted to the unprocessed data database(s) 122 based on the scheduling information. The scheduling information can include, for example, a scheduling time value, a time period threshold, any other types of scheduling information, or any combination thereof, associated with the unprocessed data transmission.

For example, the unprocessed data can be transmitted based on at least one of the network node(s) and/or at least one of the network device(s) (e.g., the notification device(s), as discussed below in further detail) identifying (e.g., automatically identifying) that a date value and/or a time value of the scheduling information meets or exceeds a current date and/or a current time, respectively. In such an example or an alternative example, the unprocessed data can be transmitted based on the at least one of the network node(s) identifying (e.g., automatically identifying) that a time period between a previous transmission of the unprocessed data and a current time meets or exceeds a threshold time period of the scheduling information.

In additional or alternative examples, the cellular network(s) 104 (e.g., at least one of the network node(s)) can transmit unprocessed data to be stored via the unprocessed data database(s) 122, based on at least one signal (e.g., at least one unprocessed data request signal). In some examples, the request signal may be received from at least one of the central server(s) 120, at least one of the automated script management server(s) 102, and/or any other device of the environment 100.

In some examples, the request signal from the central server(s) 120 for the unprocessed can be transmitted based on another request signal transmitted by the automated script management server(s) 102, as part of automated script execution, based on the automated script management server(s) 102 identifying execution of at least one of the database script(s) is being processed and/or queued for processing. In those examples, the other request signal may be transmitted by the automated script management server(s) 102 based on the automated script management server(s) 102 identifying that at least one of the script(s), while being executed, relies on, access, modifies, deletes, etc., any least one portion of the unprocessed data to be requested by the automated script management server(s) 102 and/or the central server(s) 120.

In some examples, transmission of the at least one unprocessed data request signal can include transmission of the at least one request signal, in response to at least one notification signal (e.g., at least one notification signal (e.g., an automated notification signal) (e.g., a network node notification signal) being transmitted by the network node(s). For example, the at least one network node notification signal may be transmitted based on the unprocessed data having been captured and/or generated, by the network node(s), based on the unprocessed data having been identified by the network node(s) as being available to be transmitted, and/or based on any other information associated with transmitting any other requests for the unprocessed data, and/or any other information associated with any received communications including the unprocessed data.

In additional or alternative examples, transmission of the at least one notification signal may be in response to at least one request signal (e.g., at least one central server request signal). For example, the at least one request signal may be received by the network device(s) and/or from at least one device (or "request device") (e.g., any device of the environment 100, such as the administrator device(s) 128, the user device(s) 130, etc., as discussed in further detail below) communicatively connected to one or more source devices (e.g., the network node(s) from which the data is to be retrieved).

In additional or alternative examples, the at least one network notification signal may be automatically transmitted by at least one of the network node(s) and/or one or more notification devices (e.g., one or more devices communicatively coupled to the network node(s) (e.g., the network node(s) being utilized to capture the unprocessed data)) (e.g., the notification device(s) that may identify monitoring information indicating data being identified, captured, and/or generated by the source device(s)). In those or other examples, the at least one network notification signal may be, alternatively or in addition, automatically transmitted by the source device(s) based on data being identified, captured, and/or generated by the source device(s); and/or based on at least one network notification signal that may be automatically transmitted by the notification device(s) based on at least one user selection identified via user input to the notification device(s) (e.g., user input to a user interface (UI) of the notification device(s)). In some examples, the user input may be utilized to indicate that unprocessed data has been identified, captured, and/or generated, etc., and/or that the unprocessed data is available to be transmitted.

Storing, via the unprocessed data database(s) 122, of the unprocessed data (e.g., the unprocessed data being transmitted by the cellular network(s) 104) can be controlled by at least one of any of the devices in the environment 100 (e.g., the cellular network(s) 104 (e.g., at least one of the network node(s)), the central server(s) 120, the automated script management server(s) 102, at least one of any other of the device(s), or any combination thereof). In various examples, the network node(s) can transmit the unprocessed data, and/or the notification device(s) can control transmission of the unprocessed data, to at least one storage device (e.g., at least one storage device of the environment 100, which can be separate from, and/or integrated with, at least one of any of the devices in the environment 100 (e.g., the central server(s) 120, the automated script management server(s) 102, at least one of any other of the device(s), or any combination thereof) utilized to manage the unprocessed data database(s) 122.

In some examples, the unprocessed data can be stored in the unprocessed data database(s) 122 based on the at least one storage device (e.g., at least one of any type of storage device, including at least one primary storage device, at least one magnetic storage device, at least one flash memory storage device, at least one optical storage device, at least one cloud storage device, at least one virtual storage device, at least one of any other type of storage device, or any combination thereof) (e.g., at least one storage device, implemented individually or in combination with, any of the other devices of the environment 100) receiving and identifying at least one storage identifier for storing the unprocessed data (e.g., the at least one storage identifier can be received separately from, and/or in combination with, the unprocessed data). In those or other examples, the unprocessed data can be received and stored based on the at least one storage identifier being transmitted by the notification device(s), the network node(s), etc.

In alternative or additional examples, the unprocessed data can be received and stored, notwithstanding the unprocessed data being received without any storage identifiers and/or storage location identifiers. In those or other examples, the unprocessed data can be received and stored, based on storing instructions and/or storing information associated with at least one of the network node(s)), the central server(s) 120, the automated script management server(s) 102, at least one of any other of the device(s), or any combination thereof. In those or other examples, the storing instructions and/or storing information can control how, and/or in what way, the unprocessed data is stored by the unprocessed data database(s) 122.

In some implementations, the term "unprocessed data" may be interpreted as referring to data (e.g., data that can include raw data, non-raw data, or any combination thereof) that has not yet been processed (e.g., processed by device(s), such as by automated script management server(s) (e.g., the automated script management server(s) 102)). However, although the term "unprocessed data" may refer to data that has not yet been processed by automated script management server(s) 102, as discussed throughout the current disclosure, it is not limited as such.

In various examples, any of one or more types of data can be processed by the automated script management server(s) 102 in a similar way as for the unprocessed data, for purposes of implementing any of the techniques as discussed here. In those or other examples, any other term referring to the data not having been processed by the automated script management server(s) 102 maybe utilized for purposes of implementing any of the techniques as discussed here.

In some implementations, the term "unprocessed data database(s)" may be interpreted as referring to databases that store data (e.g., the unprocessed data) that has not been processed (e.g., processed by device(s), such as by automated script management server(s) (e.g., the automated script management server(s) 102)). However, although the term "unprocessed data databases" may refer to databases utilized to store the data not having been processed by the automated script management server(s) 102, as discussed throughout the current disclosure, it is not limited as such.

In some examples, any of one or more databases and/or storage components and/or systems of any types can be utilized to store any type of data, and to be processed based on execution of script orchestration information (e.g., information in a script orchestration engine) and execution of any types of scripts, in a similar way as the unprocessed data database(s) 122 being processed by the database scripts according to the script orchestration information, for purposes of implementing any of the techniques as discussed here. In those or other examples, any other term referring to the database(s) storing data (e.g., the unprocessed data) not having been processed by the automated script management server(s) 102 may be utilized for purposes of implementing any of the techniques as discussed here.

Although the unprocessed data can include unprocessed data associated with at least one of the cellular network(s) 104 and/or at least one of the network node(s), as discussed above in the current disclosure, it is not limited as such. In some examples, any of one or more types of unprocessed data, which can include any unprocessed data associated with at least one of the cellular network(s) 104, at least one of the network node(s), at least one of the UEs 106, any other types of network, system, and/or device, or any combination thereof, can be utilized in a similar way as for the unprocessed data in order to implement any of the techniques as discussed throughout the current disclosure.

In various examples, the automated script management server(s) 102 can be utilized to perform orchestration of execution of the script(s) (e.g., the database script(s)) (or "database management script(s)"), which can be utilized to manage and/or process the unprocessed data. In those or other examples, orchestration of the execution of the script(s), which can be performed by one or more devices (e.g., the automated script management server(s) 102) of the environment 100, can include automated orchestration of the execution of the script(s).

In some implementations, the automated script management server(s) 102 performing the automated orchestration of the execution of the script(s) can include receiving the script(s) from one or more script provisioning devices 124. In various examples, at least one of the script(s) can be received from individual ones of at least one of the script provisioning device(s) 124. In those or other examples, at least one script can be received from at least one of the script provisioning device(s) 124, and at least one other script can be received from at least one other of the script provisioning device(s) 124.

In various implementations, the automated orchestration can be performed based on one or more communications (e.g., one or more transmissions of one or more signals and/or messages including the script(s)) of the script(s) being initiated by at least one of the device(s) of the environment 100. In some examples, the communication(s) of the script(s) can be initiated by the automated script management server(s) 102, the script provisioning device(s) 124, the administrator device(s) 128, the user devise(s) 130, at least one of any of the other device(s), or any combination thereof.

The communication(s) being initiated by the script provisioning device(s) 124 can include the script provisioning device(s) 124 determining to transfer, and transferring, the script(s) based on various types of data, such as script completion information, user input data, transmission scheduling information, etc. The script completion information can include at least one flag (e.g., at least one script completion flag being associated with, and/or being set to have a value (e.g., a true value, such as by changing a boolean flag value of "0" to be "1")) indicating, and/or being associated with, at least one of the script(s) being complete (e.g., ready to be executed, transferred, etc.).

The script completion information can include automated script completion information being transmitted via script generation software being executed on the script provisioning device(s) 124, the automated data including the script(s) (e.g., data (or "script data") of the script(s)), data (or "flag data") of the flag(s) (e.g., at least one completion flag associated with at least one of the script(s)) (e.g., a flag with a boolean value), etc., or a combination thereof.

In some examples, the flag data including the flag(s) can be transmitted by and received from, the script provisioning device(s) 124 in combination with, and/or separate from, the communication(s) including at least one of the script(s) (e.g., the communication(s) of the flag(s) and the script(s) can include information identifying each of the other communication(s) and/or information identifying content (e.g., information) in each of the other communication(s)). In those or other examples, at least one of the script(s) being received without any flag data, can represent, and/or be utilized itself as the script completion information. In those or other examples, identifying the at least one of the script(s) being received without the flag data can be used as the completion information (e.g., at least one completion value associated with the script(s) having been completed and received).

However, although identifying the at least one of the script(s) being received without the flag data can be used as the completion information as discussed above in the current disclosure, it is not limited as such. In alternative examples (e.g., such as for the automated script management server(s) 102 being controlled to operate in a different mode than for when the identifying of the at least one of the script(s) being received without the flag data is utilized as the completion information), identifying at least one of the script(s) being received without the flag data can be utilized to identify an absence of the completion information being received with the at least one of the script(s), which can be utilized as at least one indication that the at least one of the script(s) being received without the flag data is partially or entirely incomplete and/or not ready to be executed.

The automated script management server(s) 102 can receive the script(s) being communicated (e.g., transmitted) by the script provisioning device(s) 124, the communication(s) (e.g., the transmission(s)) of the script(s) being represented by dotted-line arrow-shaped geographic symbols, as illustrated in FIG. 1. The automated script management server(s) 102 can maintain script status information. The script status information, in some cases, can be identified based on the script completion information. In some examples, at least some portions of the script status information can be separate from, and identified based on, at least some corresponding portions of the script completion information (e.g., a status value for a script can be set as "completed" based on a completion value (e.g., a completion value of "true") for a script. In alternative examples, the scrip status information and the script completion information can be integrated, as the same information (e.g., the script completion information can be saved in the automated script management server(s) 102 as the script status information).

Script status information (e.g., script status information received with the script(s), and/or script status information generated by the automated script management server(s) 102 based on analysis of the script(s) being received) can include one or more status values associated with script(s) being stored by, and/or received by, the automated script management server(s) 102, one or more status values associated with script(s) being updated and/or modified, one or more status values associated with script(s) being deleted, one or more status values associated with script(s) being hidden and/or suspended (e.g., temporarily or permanently suspended), etc. The script status information can be updated based on the script completion information received from the script provisioning device(s) 124.

In some examples, the script status value(s) can be set to identify at least one status of the corresponding script(s). For example, a status value of a script can be set as "received" and/or "completed" to indicate the script has been completed and received. The status value can be set as "deleted" based on the automated script management server(s) 102 being controlled to delete the script, and/or based on a delete message associated with the script being received from a script provisioning device 124. The status value can be set as "hidden," "temporarily suspended," or "permanently suspended" based on the automated script management server(s) 102 being controlled to hide, temporarily suspend, or permanently suspend, respectively, the script, and/or based on a hide message, a temporarily suspend message, or a permanently suspend message, respectively, associated with the script being received from a corresponding script provisioning device 124.

In various implementations, at least one of the communication(s) by the script provisioning device(s) 124 and to the automated script management server(s) 102 can be automatic, manual, or semi-automatic (e.g., automated, but incorporating, for example, user confirmation and/or user acceptance, which may be received via user input, such as to the automated script management server(s) 102 and/or the script provisioning device(s) 124). In some examples, transmission (e.g., automated transmission) of at least one of the scripts by the script provisioning device(s) 124 can be dynamic, scheduled, and/or triggered.

For instance, with an example in which the transmission is dynamic, a script (e.g., script data), and/or a portion (e.g., script data associated with a partial portion or an entire portion) of the script, can be automatically transmitted as it is modified and/or stored by the script provisioning device(s) 124. Dynamic transmissions can include, for example, transmissions of the script (e.g., script data), and/or the portion (e.g., script data associated with a partial portion or an entire portion) of the script, in real time as the script is updated and/or stored in the script provisioning device(s) 124. Dynamic transmissions can be performed by the script provisioning device(s) 124 without requiring information and/or input except for the script and/or the portion of the script being updated and/or stored.

In various implementations, automated transmission being scheduled can include at least one of the script(s) being transmitted based on scheduling information (e.g., unprocessed data transmission scheduling information of the scheduling information). The transmission scheduling information can include, for example, a script transmission scheduling time value, a time period threshold, any other types of scheduling information, or any combination thereof. For example, a script can be transmitted based on the script provisioning device(s) 124 identifying (e.g., automatically identifying) that a date value and/or a time value of the transmission scheduling information meets or exceeds a current date and/or a current time, respectively. In such an example or an alternative example, a script can be transmitted based on the script provisioning device(s) 124 identifying (e.g., automatically identifying) that a time period between a previous transmission of a script and a current time meets or exceeds a threshold time period of the transmission scheduling information.

In various implementations, automated transmission being triggered can include at least one of the script(s) being transmitted based on triggering data. The triggering data can include, for example, at least one triggering value being set based on the script provisioning device(s) 124 identifying at least one type of at least one action occurs. In various examples, the at least one action utilized to set the at least one triggering value can include any type of action associated with at least one file and/or file data, at least one software program and/or software program data, at least one software application and/or software application data, at least one device (e.g., device data, sub-device, sub-device data, etc.) or component (e.g., component data) of the script provisioning device(s) 124, etc., or any combination thereof. For example, an action can include a program associated with a script being shutdown (e.g., due to user input, a program error, a device error, a sub-device error, etc. associated with the script provisioning device(s) 124), at least one selection (e.g., a program close selection) associated with the program being received, etc.

In various implementations, semi-automatic and/or manual transmission of at least one of the script(s) can include transmission based on at least one user selection being received via user input to the script provisioning device(s) 124 (e.g., user input to a user interface (UI) of the script provisioning device(s) 124). For instance, with examples in which manual transmission is utilized to transmit at least one of the script(s), a script can be transmitted based on the at least one user selection including a transmission request selection associated with the script, a destination location (e.g., a network and/or a device identifier associated with the automated script management server(s) 102) associated with the transmission request, etc., or a combination thereof.

In some examples, the selection(s) (e.g., for the semi-automatic transmission) (e.g., for the manual transmission) can be received via user input to at least one device (e.g., the automated script management server(s) 102 and/or the script provisioning device(s) 124). For instance, with examples in which manual transmission is utilized to transmit at least one of the script(s), at least one of the selection(s) can include at least one request to receive an individual script. In those or other examples, at least one of the selection(s) can include at least one request to receive a group of script(s), any script(s) that are completed, available, etc., or a combination thereof.

Although various numbers of the script(s) can be received from the script provisioning device(s) 124 and by the automated script management server(s) 102, as discussed above in the current disclosure, it is not limited as such. In some examples, any number of groups of the script(s) can be received from any number of individual ones of the script provisioning device(s) 124, and be stored by the automated script management server(s) 102.

The automated script management server(s) 102 can be utilized to execute at least one automated script engine to orchestrate the script(s), the utilization of the automated script management server(s) 102 to orchestrate the script(s) being represented by a dotted-line star-shaped geographic symbol, as illustrated in FIG. 1.

In some examples, execution of the script engine can include orchestration of the script(s), performance of at least one other action, or any combination thereof. In alternative examples, execution of the script engine can include orchestration of the script(s) (e.g., orchestration of the script(s) being performed, exclusively, via the script engine, based on the script engine not performing any other actions), which may be performed separately from performance of at least one other action, the at least one other action being performed based on execution of other software (e.g., at least one other program).

Orchestrating of the script(s) can be performed, via a software program of the automated script management server(s) 102, by sorting the script(s) based on script order information (e.g., at least one order value, at least one priority value, at least one status value, at least on availability value, etc., associated with at least one corresponding script) (e.g., the script order information 206, as discussed below with reference to FIG. 2), the script order information being associated with the script(s).

In various implementations, execution of at least one automated script engine and/or orchestration of the script(s), can be automatic (e.g., performed dynamically). In some examples, execution of the automated script engine and/or orchestration of the script(s) can be dynamic, scheduled, and/or triggered. For instance, with an example in which the script engine execution and/or the script orchestration is dynamic, corresponding placements of the script(s) (e.g., script data) in an order of execution, can be automatically identified by the automated script management server(s) 102.

Dynamic script engine execution and/or dynamic script orchestration can include, for example, script engine execution and/or the script orchestration being performed by the automated script management server(s) 102 in real time as the script(s) are updated, stored, received, etc., or any combination thereof. Dynamic script engine execution and/or dynamic script orchestration can be performed by the automated script management server(s) 102 without requiring information and/or input except for the script and/or the portion of the script being updated, stored, received, etc., or any combination thereof.

In various implementations, automated script engine execution and/or script orchestration being scheduled can include at least one of the script(s) being sorted (e.g., placed into an order via order identifier(s) for execution of the script(s), which may or may not include the script(s) actually being relocated according to order placements) based on orchestration scheduling information. The orchestration scheduling information can include, for example, at least one orchestration scheduling value being set based on the automated script management server(s) 102 identifying that a current date and/or a current time meets or exceeds a date value and/or a time value of scheduling information (e.g., orchestration scheduling information of the scheduling information), respectively. In such an example or an alternative example, the automated script engine execution and/or script orchestration can be performed by the automated script management server(s) 102 based on the automated script management server(s) 102 identifying (e.g., automatically identifying) that a time period between a previous orchestration time (e.g., a previous time associated with a previous automated script engine execution and/or previous script orchestration) and a current time, meets or exceeds a threshold time period of the orchestration scheduling information.

By utilizing time periods to perform orchestration based on a desired date and/or a desired time, and/or based on a time period for orchestration being exceeded, orchestration can be performed. The scheduling information can be utilized to ensure that orchestration occurs at desired times and/or after expiration of desired time periods from orchestration previously performed.

In various implementations, automated script engine execution and/or script orchestration being triggered can include at least one of the script(s) being transmitted by the script provisioning device(s) 124, and/or at least one of the script(s) being sorted by the automated script management server(s) 102 in response to triggering data (e.g., script orchestration triggering data). The triggering data can include, for example, at least one triggering value being set based on the script provisioning device(s) 124 and/or the automated script management server(s) 102 identifying at least one type of at least one action occurs.

In various examples, the at least one action utilized to set the at least one triggering value can include any type of action (e.g., execution, saving, modifying, receiving, etc., or any combination thereof) associated with at least one file (e.g., at least one script file being received, stored, modified, deleted, etc.), at least one software program, at least one software application, at least one device (e.g., sub-device) or component of the script provisioning device(s) 124 and/or the automated script management server(s) 102, etc., or any combination thereof. For example, an action can include a request (e.g., an open request, a shutdown request, etc.) associated with a program (e.g., a program associated with the script(s)) to be opened or shutdown (e.g., due to user input, a program error, a device error, a sub-device error, etc. associated with the script provisioning device(s) 124 and/or the automated script management server(s) 102), at least one selection (e.g., a program close selection associated with the program) being received, etc.

In some implementations, the script order information can be identified by the at least one automated script engine by executing, by the automated script management server(s) 102, of software, a program, and/or an application utilized to analyze and sort the script(s) (e.g., organize the script(s) to be executed according to the script order information). Analysis of the script(s), for example, can include automated analysis of the script(s) to identify script execution order information associated with the script(s). In some examples, the program utilized to sort the scripts can include the at least one automated script engine.

In various examples, the script execution order information can include dependency information. The dependency information can include at least one dependency value associated with any of at least one portion of a corresponding script.

The dependency information, for example, can be associated with a portion of a script. For instance, in an example with at least one dependency value being identified for the script, the dependency information can include information associated with at least one of any portion of the script that depends on any other portion of another script, any portion of code in the script that depends on any other portion of code in another script, etc. (e.g., any portion of the script and/or code in the script for which execution depends on execution of any other portion of another script and/or of other code in the other script), or any combination thereof.

In some implementations, the dependency information can be associated with various types of software, code, portions of a script, etc. For example, the dependency information can include information associated with a resource (e.g., a data value, a variable, a parameter, etc.) being accessed by the script during execution of the script (e.g., based on an existence of at least one other script utilizing the same resource). In such an example or another example, the dependency information can include information associated with a lock (e.g., a software mechanism enforcing at least one limit on access to a resource based on an existence of at least one other thread of execution, including at least one other script to be concurrently (e.g., simultaneously) executed) being accessed by the script during execution of the script.

In various implementations, the dependency information can be associated with at least one resource and/or at least one lock (e.g., at least one data lock preventing entering and/or updating data) based on the at least one resource and/or the at least one lock being associated with at least one of the script(s). By way of example, the dependency information can include, for a resource to be accessed during execution of a script, at least one dependency value (e.g., at least one resource location identifier, at least one script identifier, at least one resource name identifier, etc.) associated with a script, based on the script including the resource being dependent on execution of another script. In such an example or another example, the dependency information can include, for a lock to be accessed during execution of a script, at least one dependency value (e.g., at least one lock location identifier, at least one script identifier, at least one lock name identifier, etc.) associated with a script, based on the script being utilized to establish and/or generate the lock for data, and on another script being utilized to perform entry and/or updates of the same data.

The automated script management server(s) 102 can identify and/or generate the dependency information by analyzing the script(s) to identify script characteristic information associate with the script(s). For example, script characteristic information associated with a script and/or a portion of a script can include at least one pattern (e.g., text pattern, word pattern, syntax pattern, etc.) in the script, and/or a portion of syntax in the script, according to a programming language with which the script was written.

In various implementations, the portion of the script can include code to read data from a table (e.g., by referencing and/or accessing a table identifiers, such as a table name, etc.), based on the table being created and/or modified by a different script. In various implementations, the portion of the script can include code to read data from a data log, based on the data log, and/or data of the log, being created and/or modified by a different script. The dependency information being generated and/or identified can include a dependency value identifying the table, a portion of the table, the log, a portion of the log (e.g., a log value, log data, etc.), etc., or any combination thereof, based on the script characteristic information indicating the portion of the script includes code to read data from the table and/or the portion of the table, and based on the table and/or the portion of the table being created and/or modified by a different script.

In some examples, the dependency information can include a priority value associated with the script being executed to create and/or modify the table and/or the portion of the table, and another priority value (e.g., a relatively lower priority value) associated with the other script being executed to read the table and/or the portion of the table. In those or other examples, the first script can be executed prior to the other script based on the script order information (e.g., the dependency information) including the priority value and the other priority value, the priority value being greater than or equal to the other priority value. The execution of the script(s) can include automated orchestration (e.g., generation of the script order information by the automated script management server(s) 102), and/or automated execution of the script prior to the other script based on the script order information (e.g., the dependency information).

In some examples, analyzing the script(s) for identifying the script order information can include automatically parsing the script(s) to determine an optimal order for execution of the script(s). Analyzing can happen dynamically or according to any time period (e.g., every second, every minute, every day, every week, every month, etc.). The time period can be adjusted, for example, via at least one user selection received via user input to the automated script management server(s) 102.

In various examples, a pseudo automated version of at least one automated script engine ("at least one automated script orchestration engine") can include a partially automated script engine being executed by the automated script management server(s) 102, based on interaction via at least one device (e.g., at least one script provisioning device) (e.g., at least one of the script provisioning device(s) 124, as discussed below in further detail) (e.g., user devices being operated by users, such as engineers), and/or based on user input (e.g., user input to a user interface (UI) of the automated script management server(s) 102). The partially automated script engine can be controlled utilizing the pseudo version of the at least one automated script engine to identify dependencies without full automation being performed. At least a portion of the script orchestrating can be controlled by automation, and at least a portion of the script orchestrating can be controlled based on at least one user selection received via user input to the automated script management server(s) 102.

In various examples, a fully automated version of at least one automated script engine can include the automated script management server(s) 102 executing a fully automated script engine to perform the script orchestration without requiring orchestration related input from devices and/or users. The script provisioning device(s) 124 can interact with the cellular network(s) 104 if some data is not obtained, and/or if any data is incorrect, old, incomplete, and automatically obtain (e.g., updated data). The script provisioning device(s) 124 can interact with the script provisioning device(s) 124 if some scripts are not obtained, and/or if any scripts are incorrect, old, incomplete, and automatically obtain scripts (e.g., updated scripts). The automated script management server(s) 102 can automatically sort the scripts and process the data, without any portion of the script orchestrating being performed via device input and/or user input.

Although the automated script engine is discussed above in the current disclosure, it is not limited as such. In some examples, the automated script engine can include any type of software, application, program, data, etc., utilized by the automated script management server(s) 102 to automatically sort, and/or determine an order for, the script(s).

In some examples, at least one dependency can be associated with building an inventory of cells (e.g., cell sites, individual ones of the cell sites including alpha, betta, and gamma cells) associate with the cellular network(s) 104. The inventory of cells can be utilized to identify locations of all sites in the cellular network(s) 104. To identify the site locations, the at least one dependency could occur within a script accessing a resource based on another script accessing a same resource. Inventory building results in dependencies of the scripts, which, as a result, may need to be ordered, due to the dependencies, for successful execution.

In some examples, a tree structure associated with management of data may utilized by a first vendor, and another tree structure associated with management of data may be utilized by a second vendor. Some of the scripts associated with the first vendor may have dependencies on other scripts associated with the first vendor. Some of the scripts associated with the second vendor may have dependencies on other scripts associated with the second vendor.

In various examples, the scripts associated with the first vendor may be sorted based on dependencies, utilizing a first script orchestration engine to identify first script order information utilized to sort the scripts associated with the first vendor. In those or other examples, the scripts associated with the second vendor may be sorted based on dependencies, utilizing a second script orchestration engine to identify second script order information utilized to sort the scripts associated with the second vendor.

The first script orchestration engine and the second script orchestration engine may be the same orchestration engine. Alternatively, the first script orchestration engine and the second script orchestration engine may be different orchestration engines of the same type or different types.

In various implementations, analyzing dependencies of scripts for generating script order information may enable successful execution of the scripts, notwithstanding some of the scripts utilizing the same parameters as other scripts. For example, if there is a specific key parameter that a script needs to look at to determine identities of some sites, and also identifies of some cells for the cellular network(s) 104, then the scrip may need to access the same parameter more than one time, by utilizing a lock. By utilizing the script order information, the script that sets the lock can be executed prior to another script accessing the parameter, to avoid problems with execution of the other script (e.g., to avoid the other script that also accesses the parameter from failing as a result of the other script waiting until the first script that sets the lock finishes).

In some examples, the automated script management server(s) 102 can sort the scripts (e.g., any number (e.g., 10, 100, 1,000, 10,000, etc.) of scripts)) in real time as they are received. For example, the automated script management server(s) 102 can identify a priority value of a script as it is received, by analyzing the script, and at least one other previously received script, to identify the script order information.

In various examples, the automated script management server(s) 102 can store, in real-time, the script and into a bucket as the script is received. In those or other examples, all scripts can be sorted into a single bucket. In alternative examples, various scripts from among a group of scripts can be stored into various buckets from among a group of buckets of any number (e.g., 1, 10, 20, etc.). In those or other examples, a script can be stored in a bucket, which may be part of a group of buckets. The script can be organized into the bucket based on a priority of the script. In some examples, another previously organized script may be in a different bucket based on the other script (e.g., a script utilized for an intermediary or relatively less important function) having a relatively lower priority and based on the different bucket being utilized to store scripts with relatively lower priorities.

In various examples, as relatively higher priority scripts in relatively higher priority buckets are executed, the relatively lower priority scripts may be moved up in the buckets until they are executed, as well. However, the relatively lower priority scripts may be moved down again as they await execution, if new relatively higher priority scripts are received. The relatively lower priority scripts may continue being moved in the buckets, again, until they are executed. In some implementations, ordering the scripts can be managed based on the placement of the scripts in the buckets, and executing scripts in certain buckets while delaying the execution of other less important scripts in other buckets. In various implementations, as relatively higher priority scripts in relatively higher priority buckets are executed, the relatively lower priority scripts may be executed without the relatively lower priority scripts being moved.

In such cases, for example, the automated script management server(s) 102 can identify the buckets to be utilized for execution of scripts and execute the scripts in the identified buckets. The scripts are placed in the buckets and execution is performed based on that, so there is no need to receive identification, from developers (e.g., operators of the script provisioning device(s) 124), of dependencies in the scripts. This enables scripts to be ordered in real-time for execution as early as possible, without any errors in execution which may otherwise occur due to developers inadvertently providing incorrect information about dependencies. This also saves time for developers, and for having scripts executed, due to sorting by the automated script management server(s) 102 being performed faster in response to automated identification of the dependencies.

In some implementations, the automated script management server(s) 102 can automatically sort the script(s) utilizing the availability information, by refraining (e.g., permanently refraining, or temporarily refraining for a period of time) from including, for purposes of generating script orchestration information, any of the script(s) associated with an availability value indicating the scrip is unavailable (e.g., not complete, not yet fully received, not yet fully stored, not ready to be executed, temporarily unavailable, etc.). The automated script management server(s) 102 can automatically sort the script(s) utilizing the availability information, by sorting any of the script(s) associated with an availability value indicating the scrip is available (e.g., complete, fully received, fully stored, ready to be executed, etc.).

In some implementations, the automated script management server(s) 102 can automatically sort the script(s) utilizing the status information, by refraining (e.g., permanently refraining, or temporarily refraining for a period of time) from including, for purposes of generating script orchestration information, any of the script(s) associated with a status value indicating the script is incorrect, corrupted, etc. The automated script management server(s) 102 can automatically sort the script(s) utilizing the status information, by sorting any of the script(s) associated with a status value indicating the script is correct, uncorrupted, etc.

In some examples, the automated script management server(s) 102 can execute the script(s) (e.g., the database script(s)) to analyze, process, transform, and/or load the unprocessed data (e.g., the unprocessed database data). The unprocessed data being received by the automated script management server(s) 102 can be analyzed and processed and utilized to generate processed data (e.g., processed database data).

In some examples, the automated script management server(s) 102 can identify one or more errors, incomplete flags, etc., associated with the script(s). For example, an error can be detected based on at least one script not being received, based on identifying from script information (e.g., script status information, which can include at least one incomplete flat that is set (e.g., set to have a value of "1"), and/or information about the script(s) received by and/or stored in the automated script management server(s) 102, the script information being received, for example, from the script provisioning device(s) 124, such as the script provisioning device(s) 124 that transmitted the script(s)). The automated script management server(s) 102 can identify and absence of the at least one script (e.g., the script status information, which can include the set incomplete flag, and/or information identifying at least one missing script, and/or at least one missing script identifier and/or any other type of missing script information). The automated script management server(s) 102 can transmit a communication (e.g., a message) to the corresponding script provisioning device(s) 124 based on the script information.

In some implementations, the message for the at least one missing script can be utilized by the script provisioning device(s) 124 to display a notification and/or to automatically transmit the at least one missing script to the automated script management server(s) 102. In various examples, in such cases in which the at least one missing script is automatically transmitted (e.g., retransmitted, replaced, recovered, etc.), the automated script management server(s) 102 can transmit, automatically, at least one replacement script (e.g., at least one script matching the at least one missing script) to the automated script management server(s) 102 (e.g., the at least one replacement script can be automatically transmitted based on at least one script identifier in the message from the automated script management server(s) 102, based on automated analysis of the transmitted script(s) utilized to identify the at least one missing script(s), based on analysis of at least one automated error message received from the script provisioning device(s) 124 identifying the at least one message, based on script status information, which can indicate at least one message transmission being incomplete, based on at least one identifier of the message not transmitted successfully, etc., or any combination thereof).

In alternative or additional examples, in such cases in which the notification is displayed, the user(s) of the script provisioning device(s) 124 can input at least one selection to request at least one replacement script (e.g., at least one script matching the at least one missing script) to be transmitted to the automated script management server(s) 102. The script provisioning device(s) 124 can transmit at the least one replacement script based on the user selection(s).

Although the at least one error can be utilized for automated transmission(s) (e.g., recovery/request transmissions and/or notification(s)) from the automated script management server(s) 102 and to the script provisioning device(s) 124, as discussed above in the current disclosure, it is not limited as such. One or more types of information (e.g., errors, flags, resend requests, etc.) can be utilized to recover, automatically and/or via user selection(s), any number of scripts based on the scripts being incomplete, missing, etc.

The recovery (e.g., automated and/or manual) can be based on the script stats information including at least one list of script(s) stored by the automated script management server(s) 102, the script provisioning device(s) 124, any other device, and/or any script list(s) (e.g., list(s) including the script(s) to be transmitted and/or necessary for execution of at least one other of the script(s)) (e.g., lists(s) including script(s) scheduled for execution) (e.g., list(s) in combination with, or separate from, scheduling information of script(s) scheduled execution and/or scheduled transmission from the script provisioning device(s) 124) (e.g., list(s) in combination with, or separate from, scheduling information indicating scheduling being automated by the automated script management server(s) 102 and/or the script provisioning device(s) 124) (e.g., list(s) in combination with, or separate from, scheduling information indicating scheduling being set via selection(s) of the users(s) of the script provisioning device(s) 124 and transmitted to the automated script management server(s) 102) (e.g., in combination with, or separate from, scheduling information indicating scheduling being set by selection(s) via the user(s) of the automated script management server(s) 102). Any combination of any type of script status information (e.g., the list(s), the scheduling information of any type, etc.) can be utilized for the list(s) and/or to replace, obtain, request, retrieve, etc. at least one missing script, at least one incomplete script, etc.

In some examples, the script(s) being identified as missing, incomplete, etc., and/or the script(s) being replaced, obtained, requested, retrieved, etc., can be performed prior to execution of any number of the script(s), in real time during the execution, after execution is partially completed, after execution stops (e.g., after execution stops due to the missing, incomplete, etc. script(s)), etc., or any combination thereof. For example, the script(s) can be identified as missing and can be recovered automatically during execution to not hold up the execution. In addition or alternatively, any other processes for recovering (e.g., automatically and/or manually recovering) the script(s) can be performed at any time before, during, or after the execution, such as automatically recovering the missing script(s), and/or sending the notifications to the script provisioning device(s) 124 and receiving the replacement script(s) based on the user selection(s), and so on.

The environment 100 can include one or more processed data databases 126, which can be utilized (e.g., utilized by the automated script management server(s) 102) to load and/or store the processed data (e.g., curated data generated via execution of the database script(s)). The automated script management server(s) 102 can store, in the processed data database(s) 126, the processed data, which can be utilized to generate one or more reports, such as by the processed data being utilized to perform automated generation of the report(s). In some examples, the automated script management server(s) 102 can extract, transform, and load, the unprocessed data, as the processed data, in the processed data database(s) 126.

In some examples, the automated script management server(s) 102 can store at least some of the processed data in the processed data databases 126, as part of execution of the script(s) utilized to generate the processed data. In those or other examples, the automated script management server(s) 102 can store at least some of the processed data in the processed data databases 126 separately from, and/or subsequent to, execution of the script(s).

The environment 100 can include one or more administrator devices 128, which can be utilized to process the processed data and generate the report(s) (e.g., report data). The administrator device(s) 128 can receive the processed data via the processed data database(s) 126. In some examples, the administrator device(s) 128 can receive the processed data based on the automated script management server(s) 102 controlling the processed data database(s) 126 to transmit the processed data, to the administrator device(s) 128. In those or other examples, the administrator device(s) 128 can retrieve the processed data from the processed data database(s) 126.

In some examples, processed data can be transmitted to the administrator device(s) 128 and via the processed data database(s) 126 in real-time. For example, the processed data can be transmitted to the administrator device(s) 128, and/or the administrator device(s) 128 can dynamically receive the processed data, automatically (e.g., via an automated process). In some examples, the automated process including the administrator device(s) 128 dynamically receiving and/or retrieving the processed data can include the processed data being transmitted, and/or retrieved, automatically based on the processed data being identified and/or stored via the processed data database(s) 126.

In additional or alternative examples, the processed data can be transmitted, and/or retrieved, automatically based on at least one signal (e.g., at least one script management server notification signal). In some examples, the script management server notification signal may be received from at least one of the automated script management server(s) 102, at least one of the script provisioning device(s) 124, and/or any other device of the environment 100. For example, the at least one script management server notification signal may be transmitted based on the processed data having been generated by the automated script management server(s) 102, and/or having been stored by the processed data database(s) 126

In some examples, transmission of the at least one script management server notification signal can be in response to at least one request signal (e.g., at least one request signal (e.g., an automated request signal) being received by the automated script management server(s) 102. For example, the at least one request signal (e.g., an administrator device request signal) may be received (e.g., received from an administrator device (e.g., any of the administrator device(s) 128)) in order to request transmission of the processed data (e.g., transmission of the processed data having been generated by the automated script management server(s) 102, and/or having been stored by the processed data database(s) 126).

In some examples, the transmission of the at least one script management server notification signal (e.g., in response to at least one request signal (e.g., the administrator device request signal)), can include the processed data, if generated and if available. If the processed data is not generated and available, the transmission of the at least one script management server notification signal, in response to at least one request signal, can include information indicating that the processed data is not generated and/or available, information indicating an error code associated with a cause of the processed data not being generated and/or available, information indicating an expected time at which the processed data will be available, any other information associated with generation and/or availability of the processed data, or any combination thereof.

In some examples, the processed data not being transmitted, due to the processed data not being generated and/or not being available, can be transmitted via the notification signal being retransmitted. The automated script management server(s) 102 can identify the processed data not being transmitted and monitor a status of generation of the processed data, and after the processed data is finished being generated, retransmit the notification signal with the processed data. In alternative examples, the notification signal does not have to be transmitted, based on the processed data being transmitted as a separate communication from the notification signal (e.g., the processed data can be transmitted instead of, or separately from, the notification signal).

In some examples, the processed data can be transmitted by the automated script management server(s) 102, and/or retrieved from the automated script management server(s) 102 and/or the processed data database(s) 126, based on various types of information, such as processed data completion information, user input data, scheduling information (e.g., processed data transmission scheduling information of the scheduling information), etc. The processed data completion information can include at least one flag (e.g., at least one processed data completion flag being associated with, and/or being set to have a value (e.g., a true value, such as by changing a boolean flag value of "0" to be "1")) indicating, and/or being associated with, at least at least a portion of the processed data being complete (e.g., ready to be transferred, utilized for report generation, etc.) and/or stored in the processed data database(s) 126.

In various examples, the administrator device(s) 128 can receive and/or retrieve (e.g., transmit at least one query, such as at least one database query) the processed data via the processed data database(s) 126 based on scheduling information. The processed data being received and/or retrieved can include at least a portion of the processed data being received and/or retrieved based on the scheduling information. The scheduling information can include, for example, a scheduling time value, a time period threshold, any other types of scheduling information, or any combination thereof, associated with the processed data communication. For example, the processed data can be received and/or retrieved based on at least one device (e.g., the administrator device(s) 128) identifying (e.g., automatically identifying) that a date value and/or a time value of the scheduling information meets or exceeds a current date and/or a current time, respectively. In such an example or an alternative example, the processed data can be received and/or retrieved by the administrator device(s) 128 based on the at least one of the administrator device(s) 128 identifying (e.g., automatically identifying) that a time period between a previous communication of the processed data and a current time meets or exceeds a threshold time period of the scheduling information.

The environment 100 can include one or more user devices 130 utilized to manage performance of one or more actions. In various examples, the action(s) can be performed based on various types of data managed by the environment 100, including the processed data, the report(s), any other type of data, or any combination thereof. The action(s) can be performed by at least one of the device(s) of the environment 100, including, for example, the administrator device(s) 128, the user device(s), any other device, or any combination thereof. The action(s) can include at least one action (e.g., at least one system and/or network management action) utilized to manage one or more systems and/or one or more networks, at least one action (e.g., at least one notification display action) utilized to display at least one notification, at least one action (e.g., at least one message transmission action) utilized to transmit at least one message (e.g., a notification message), any of at least one of various types of other actions, or any combination thereof.

In some implementations, the at least one system and/or network management action can include individual ones of at least one of the network node(s) of at least one of the cellular network(s) 104 being activated, deactivated, reactivated, modified, suspended, unsuspended, updated, controlled via any other function (e.g., at least one cellular service path being established, modified, etc., at least one cellular service being established, modified, etc., and/or at least one other cellular function being established, modified, etc.), or any combination thereof. In some examples, at least one of the user device(s) 130 can identify and/or receive the report(s), and/or analyze the report(s).

The user device(s) 130 can present (e.g., display) the report data (e.g., the report(s). The report data can be presented by at least one display of the user device(s) 130. The displayed report data can be updated to display updated report data, and/or any report data can be displayed to replace previous report data (e.g., report data previously presented by the at least one display. The report data can be displayed, alternatively or in addition to, any other type of data, such as application data (e.g., software application data) (e.g., data utilized by a program being executed by the user device(s) 130, etc.

Although the user device(s) 130 can present data as discussed above in the current disclosure, it is not limited as such. One or more devices of any type (e.g., the central server(s) 120, the script provisioning device(s) 124, the administrator device(s) 128, the user device(s) 130, etc., can display any data capable of being displayed by the user device(s) 130 in a similar way as discussed above the user device(s) 130 or any other of the device(s) of the environment 100, for implementing any of the techniques as discussed herein.

In some examples, at least one of the network node(s) can be modified or deactivated automatically based at least in part on the report data indicating the at least one network node is defective. In those or other examples, the at least one of the network node(s) can be modified or deactivated based on one of the user device(s) 130 identifying at least one user selection received via user input to the user device(s) 130. The at least one user selection may be received based on the report data being previously and/or currently presented by a user device 130. The user device 130 can transmit, to the at least one network node, at least one control signal including network management data, based at least in part on the at least one user selection.

In some examples, network management data being transmitted automatically, or based on at least one user selection maybe utilized to control the at least one network node, based on the report data. In those or other examples, the network management data can be utilized to control the network node by causing, for the at least one network node, performance of activation, deactivation, reactivation, modification, suspension, unsuspension, performance of at least one update, at least one of any other function, or any combination thereof.

In those or other examples, the user device(s) 130 can identify, based on the report(s), network node data and/or at least one status associated with at least one of the network node(s). The network node data can include any data utilized for operation of at least one of the network node(s). The at least one status can include a status indicator associated with at least one of the network node(s), and/or with operation of the at least one of the network node(s).

In some examples, the user device(s) 130 can be utilized to perform at least one action (e.g., at least one of activating, deactivating, reactivating, modifying, suspending, unsuspending, updating, any other function, or any combination thereof) associated with the network node(s), and/or transmit a message (e.g., transmit a message to the at least one device utilized to control the network node(s) and/or to the source device(s)) causing the at least one action to be performed.

In some examples, the user device(s) 130 can be utilized to perform at least one notification action associated with the at least one system and/or network management action (e.g., the at least one of the activating, deactivating, reactivating, modifying, suspending, unsuspending, updating, any other function, or any combination thereof) associated with the network node(s). The notification action can be utilized to present a notification via the at least one display of at least one of the user device(s) 130. The notification being presented can include information (e.g., written text, symbols, graphs, any other output of any presentation format, or any combination thereof) representing and/or communication the at least one system and/or network management action.

In some examples, the user device(s) 130 can be utilized to perform at least one message action associated with the at least one system and/or network management action (e.g., the at least one of the activating, deactivating, reactivating, modifying, suspending, unsuspending, updating, any other function, or any combination thereof) associated with the network node(s). The at least one message action can be utilized to transmit at least one message by the user device(s) 130 and to at least one of any other device of the environment 100. The at least one message being transmitted can be utilized to display (e.g., can trigger display), by the device receiving the message, of information (e.g., written text, symbols, graphs, any other output of any presentation format, or any combination thereof) representing and/or communication the at least one system and/or network management action.

In various implementations, at least one of any of one or more actions (e.g., the generating of the report(s) utilizing the processed data, at least one action (e.g., at least one of the management action(s), at least one of the notification action(s)) notifications being transmitted and/or displayed, etc.) can be performed by at least one of the device(s) of the environment 100. The at least one of the other action(s) being dynamically performed can include the at least one of the other action(s) being performed automatically and/or on a continuous (e.g., ongoing, uninterrupted) basis. Any of the action(s) can be performed and/or reperformed as the report (s) are identified, generated, modified, deleted, retracted, etc., the communicate, display, etc. information associated with the report(s), and/or to control network node(s) based on the report(s) indicating information (e.g., information indicating operation, status, errors, upgrades, etc.) associated with the network node(s) and/or at least one other type of device of the environment 100.

Although the environment 100 can include various devices associated with the cellular network(s) 104, and/or various devices including the automated script management server(s) 102, the central server(s) 120, the administrator device(s) 128, the user device(s) 130, and/or at least one other device of any type, as discussed above in the current disclosure, it is not limited as such. In some examples, any of the devices associated with the cellular network(s) 104, and/or any of the devices including the automated script management server(s) 102, the central server(s) 120, the administrator device(s) 124, the user device(s) 130, and/or at least one other device of any type, can be implemented, individually or in any combination of an type, as one or more virtual and/or cloud computing devices, a group of virtual and/or cloud computing devices, one or more physical devices, one or more device clusters, any other types of devices and/or groups of devices, or any combination thereof.

Although the automated script management server(s) 102 can execute the script orchestration engine to process unprocessed data, as discussed above in the current disclosure, it is not limited as such. In some examples, any type of data can be processed based on any types of functions being sorted by an orchestration engine in a similar way as for the script orchestration engine and utilized to implement any of the techniques discussed herein.

In various examples, at least one automated orchestration management server can be utilized for sorting software for deployment on at least one base station (e.g., at least one cellular tower). The automated orchestration management server can perform coordination to deploy the software in a similar way as for analysis of the database scripts, to ensure that none of the software is deployed too early. Software orchestration information (e.g., dependency information) can be identified by analysis of the software (e.g., software files) in a similar way as for the analysis of the scripts. Software orchestration information can be utilized for prioritization (e.g., automated prioritization or automated utilization) of the software, to deploy the software to prevent human errors. The automated orchestration management server can be utilized to prevent problems in deployment of the software, due to dependencies, based on the automated analysis and sorting of the software.

Although the system(s) and the device(s) are included in the environment 100 as discussed above in the current disclosure, it is not limited as such. However, the terms "system" and "device" are utilized throughout the current disclosure for convenience of explanation. In various examples, any of various types of devices can be utilized as any of the system(s) and/or any of the device(s) for implementation of any of the techniques as discussed throughout the current disclosure.

Figure 2:
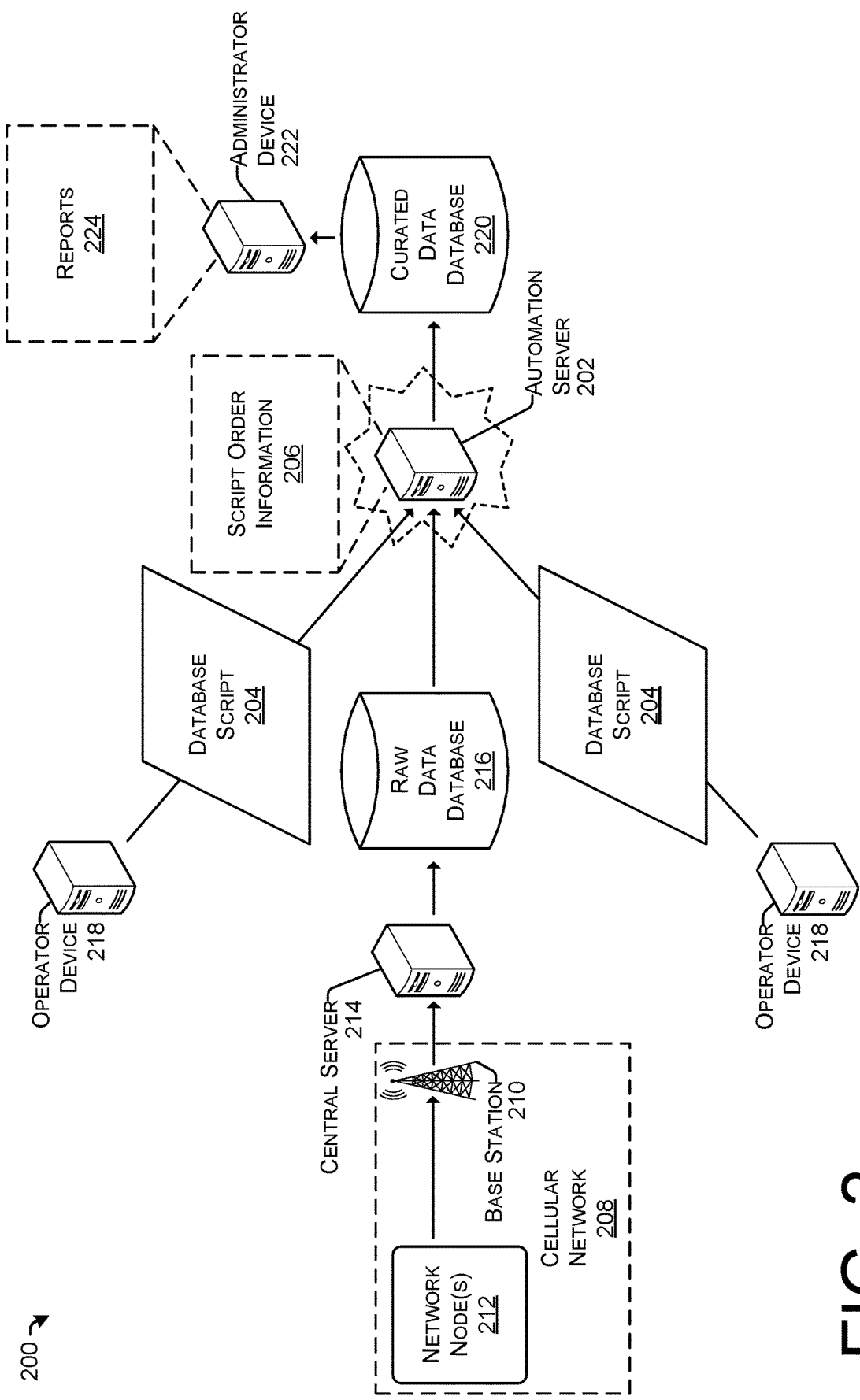
FIG. 2 schematically illustrates an example environment including servers for obtaining unprocessed data, storing the unprocessed data in a database, executing database scripts to manage the unprocessed data, generating curated data based on the unprocessed data, and generating reports utilized to perform actions based on the reports.

FIG. 2 schematically illustrates an example environment 200 including servers for obtaining unprocessed data, storing the unprocessed data in a database, executing database scripts to manage the unprocessed data, generating curated data based on the unprocessed data, and generating reports utilized to perform actions based on the reports, in accordance with some examples of the present disclosure. In some examples, the environment 200 can be implemented as a portion of the environment 100, as discussed above with reference to FIG. 1.

The environment 200 can include an automation server 202. In some examples, the automation server 202 can be implemented as any of the automated script management servers 102, as discussed above with reference to FIG. 1.

The automation server 202 can be utilized to orchestrate (or "sort") scripts (e.g., database scripts) 204 based on script order information 206, utilization of the automation server 202 to orchestrate the database scripts 204 being represented by a dotted-line star-shaped geographic symbol, as illustrated in FIG. 2. In some examples, the automation server 202 can execute an automated script engine to orchestrate the database scripts 204, the database scripts 204 being analyzed and sorted via execution of the automated script engine.

Orchestrating the database scripts 204 can be performed by the automation server 202 performing execution of the automated script engine. In some examples, execution of the automated script engine and/or performance of ordering of the database scripts 204 can be dynamic, scheduled, and/or triggered, in a similar way as for the script engine execution and/or the orchestration being performed, as discussed above with reference to FIG. 1.

Orchestrating the database scripts 204 can be performed by the automation server 202 executing the automated script engine to identify, receive, retrieve, and/or obtain the database scripts 204. In some implementations, execution of the automated script engine can be triggered based on the identifying, receiving (e.g., receiving without receiving any prior message associated with script availability), retrieving (e.g., retrieving, such as transmitting a request, based on a received message indicating script availability) (e.g., retrieval of a script, such as from a script database and/or storage location, by the automation server 202), storing, and/or obtaining (e.g., obtaining the database scripts 204, based on one or more corresponding requests transmitted by the automation server 202, and from one or more devices (e.g., the operator device(s) 218, as discussed below in further detail)) of the database scripts 204.

In various examples, the triggering information (e.g., at least one triggering value associated with at least one corresponding script) can indicate the corresponding database scripts 204 being identified, received, retrieved, stored, and/or obtained. For example, the orchestration of the database scripts 204 can be triggered based on an individual one of a triggering value (e.g., a triggering value indicating a script has been identified, received, retrieved, stored, or obtained), or based on any combination of any number of the triggering values of various types associated with any number of database scripts (e.g., triggering values associated with a number of database scripts exceeding a threshold number of database scripts).

In various examples, the orchestration of the database scripts 204 can be triggered based on an individual one of a triggering value associated with a database script having an importance level In those or other examples, triggering values associated with a number of database scripts begin received may have an importance level exceeding a threshold importance level, the importance level being relatively higher for a database script that is relatively more important and/or has a greater impact on functionality and/or quality of the network, and having a functional and/or quality level above a threshold functional and/or quality level, in comparison to a database script with a relatively lower importance level). For example, some database scripts that are more important may cause the automation server 202 to determine script order information, whereas other less important scripts may not.

Identifying the database scripts 204 can include the automated script engine identifying the database scripts 204 being received and/or stored (e.g., performing identification of reception and/or storage of the database scripts 204 via automated detection). Identifying the database scripts 204 being received can include identifying at least one identifier associated with at least one of the database scripts 204 being received, identifying data associated with at least one of the database scripts 204 (e.g., identifying, via analysis of the data, which of at least one of the database scripts 204 with which the data is associated) (e.g., identifying, via analysis of the data, at least one identifier of at least one one of the database scripts 204 based on identifying the data is associated with the at least one of the database scripts 204 being received, or a combination thereof.

In various examples, identifying the database scripts 204 can include identifying the scrip(s) being received and received (e.g., based only on at least one received status value), identifying the database scripts 204 being stored (e.g., based only on at least one storage status value), identifying the scrip(s) being received and stored (e.g., based on at least one received status value at least one storage status value). Identifying the database scripts 204 being received and identifying the database scripts 204 being stored can be performed separately or can be integrated into the same identifying process. In some examples, identifying the database scripts 204 being stored can include identifying at least one identifier associated with at least one corresponding script and/or the data associated with at least one corresponding script, and identifying the at least one identifier and/or the data being stored. In those or other examples, identifying the database scripts 204 being stored can include identifying at least one storage location identifier associated with at least one storage location of the at least one identifier and/or the data.

In various examples, identifying the database scripts 204 can include the automated script engine retrieving the database scripts 204 (e.g., retrieving the database scripts 204 from at least one operator device of the operator device(s), as discussed below in further detail). The automated script engine can retrieve the database scripts 204 based on identifying the database scripts 204 are ready to be retrieved. Identifying the database scripts 204 are ready to be retrieved can include identifying at least one flag (e.g., at least one flag with a boolean value). For example, at least one completed flag being set (e.g., being given a value of "true") may be utilized to identify at least one of the database scripts 204 that is ready to be retrieved, the at least one completed flag being associated with at least one corresponding database script 204.

Identifying the database scripts 204 are ready to be retrieved can include identifying modification and/or storage of at least one of the database scripts 204. In some examples, the automated script engine can identify the database scripts 204 are ready to be retrieved based on completion information being received, the completion information including at least one script identifier associated with at least one corresponding script. In those or other examples, the automated script engine can identify the database scripts 204 are ready to be retrieved based on the completion information indicating at least one status (e.g., modification status information, storage status information, at least one other type of status information, or any combination thereof) associated with individual ones of at least one corresponding script.

In various implementations, individual ones of the modification status information, the storage status information, and/or the at least one other type of status information can include at least one status value. In some examples, the modification status information can include at least one modification status value associated with the at least one corresponding script, the modification status value indicating that the at least one corresponding script was modified. In those or other examples, the storage status information can include at least one storage status value associated with the at least one corresponding script, the storage status value indicating the at least one corresponding script was completed and stored (e.g., edited and saved, stored, etc., or any combination thereof).

Although the completion information can include various types of information being separate from one another, such as modification status information and/or storage status information, as discussed above in the current disclosure, it is not limited as such. In some example, one or more of any types of the completion information can be integrated together (e.g., the modification status information and the storage status information can be integrated together and utilized together, in a similar way as discussed above for each of the modification status information and the storage status information). Various types of information (e.g., modification information, storage status information, etc.) can trigger the database scripts 204 to be received, as an indication that execution of the modified database scripts 204 is pending and/or ready to be performed.

In various implementations, identifying the database scripts 204 can include the automated script engine identifying the database scripts 204 being received and/or stored by performing identification of the database scripts 204 based on reception of at least one notification message (or "notification") (e.g., manual notification message). In some examples, the at least one manual notification can be received from at least one device, based on user input to the at least one device (e.g., user input to a user interface (UI) of the at least one device) to create, modify, store, delete, and/or update at least one script and/or perform any other function of any type associated with the at least one script. In those or other examples, the at least one manual notification can be transmitted by the at least one device based on at least one user selection received via the user input.

Various types of user selections can be utilized to transmit database scripts 204 and/or, separately or in combination, notifications associated with database scripts 204. In various cases, the at least one user selection can include at least one request to transmit the at least one script and/or the at least one notification. The at least one notification can be transmitted based on at least one user selection of various types. For example, at least one notification associated with a script can be transmitted based on at least one user selection being received via user input and utilized to create, modify, store, delete, and/or update the script.

In some examples, the environment 200 can include a cellular network 208. In some examples, the cellular network 208 can be implemented as any of the cellular network(s) 104, as discussed above with reference to FIG. 1.

In some examples, the environment 200 can include a base station 210. In some examples, the base station 210 can be implemented as any of the base station(s) 108, as discussed above with reference to FIG. 1.

In some implementations, the environment 200 can include one or more network nodes 212. In some examples, any of at least one of the network node(s) 212 can be implemented as any of at least one of an access and mobility management function (AMF) (e.g., any of the AMFs 110), a session management function (SMF) (e.g., any of the SMFs 112), a user plane function (UPF) (e.g., any of the UPFs 114), a policy control function (PCF) (e.g., any of the PCFs 116), a network repository function (NRF) (e.g., any of the NRFs 118), or any other network node of any type, as discussed above with reference to FIG. 1.

In some implementations, the environment 200 can include a raw data database 216 and a central server 214. In some examples, the central server 214 can be implemented as any of the central server(s) 120, as discussed above with reference to FIG. 1. In those or other examples, the raw data database 216 can be implemented as any of the unprocessed data database(s) 122, as discussed above with reference to FIG. 1.

Although the raw data database 216 can be utilized to store raw data associated with the cellular network 208, as discussed above in the current disclosure, it is not limited as such. Any type of database (e.g., an unprocessed data database) utilized to store any type of data (e.g., unprocessed data) can be utilized instead of, and/or in a similar way as, the raw data database 216 to implement any of the techniques as discussed herein.

In some implementations, the environment 200 can include operator devices 218. In some examples, any of the operator devices 218 can be implemented as any of the script provisioning devices 124. Individual ones of the operator devices 218 can transmit at least one script (e.g., at least one of any of the scripts 204) (e.g., at least one script from among a list of the scripts 204), to the automation server 202.

The automation server 202 can receive the scripts 204 and store the scripts 204. In some examples, the automation server 202 can store at least one of the scripts 204 into at least one bucket (e.g., at least one unit of storage (e.g., one complete disk block, etc.) based on, for example, a mapping function (e.g., a hash function) to map a set of the database scripts 204 to an address of a storage device utilized to store the database scripts 204). For example, a single bucket, or, possibly, a single group of buckets, may, in some cases, be utilized to store the scripts 204, for purposes of efficiency. In some implementations, the bucket(s) can be utilized to generate a virtual framework by which the database scripts 204 are sorted in memory in an order of execution. The automated script management server(s) 102 can utilized dependencies of the database scripts 204 to sort the database scripts 204, to ensure that the database scripts 204 are executed in an order as specified by the virtual framework. By utilizing the virtual frames, errors in execution of the database scripts 204 can be prevented via an automated process.

The automation server 202 can identify and/or generate script order information 206 based on the scripts 204. In some examples, the script order information 206 can be generated without the database scripts 204 being related, for purposes of efficiency. An order of execution may be identified and utilized to queue the database scripts 204 for execution, based on the database scripts 204 remaining in their original location. However, in other examples, it is still possible to move and/or sort the database scripts 204 prior to execution.

In various examples, orchestrating the database scripts 204 can include analyzing and sorting the database scripts 204 based on portions of the database scripts 204, as discussed above with reference to FIG. 1. For example, the portions (e.g., predetermined portions and/or identified portions) of the database scripts 204 utilized for performing analysis of the database scripts 204 can include text (e.g., at least one ascii characters and/or at least one character of any other format) (e.g., at least one predetermined and/or any other type of text), at least one text pattern (e.g., at least one predetermined and/or any other type of text pattern), at least one keyword (e.g., at least one predetermined and/or any other type of keyword), at least one keyword pattern (e.g., at least one predetermined and/or any other type of keyword pattern), language (e.g., software language) (e.g., at least one predetermined and/or any other type of language), at least one language pattern (e.g., at least one predetermined and/or any other type of language pattern), syntax (e.g., at least one predetermined and/or any other type of syntax), at least one syntax pattern (e.g., at least one predetermined and/or any other type of syntax pattern), etc.

In some examples, execution of at least one script orchestration engine can be performed to identify script order information, and, possibly, prior to identifying the script order information, retrieval of the unprocessed data. In various examples, the at least one script orchestration engine can be executed sort the database scripts 204, separately from, or in combination with, processes utilized to retrieve the unprocessed data.

In some examples, the database scripts 204 (e.g., the portions of the database scripts 204) can be analyzed to identify and/or generate the script order information 206, which can include dependency information. The dependency information can include priority information (e.g., at least one priority value) associated with at least one of the database scripts 204. The script order information 206 can include order information including an order in which each of the database scripts 204 are placed for execution.

In various examples, additionally or alternatively to the order information, the priority information, and/or the dependency information in the script order information 206, the script order information 206 can include status information, availability information, any other type of execution information, or any combination thereof. The status information can include one or more status values associated with the corresponding database scripts 204. For example, a status value can include a completed status, a modified status, an available status (e.g., available or not available), etc., or any combination thereof.

In various examples, the availability information can include one or more availability values associated with the database scripts 204. The availability value(s) can indicate one or more types of availability, such as whether the database scripts 204 are available to be executed, scheduled or predicted to be available to be executed, available to be retrieved and stored for execution, currently stored for execution, etc.

Sorting of the database scripts 204 can include sorting the database scripts 204, based on prioritization of the database scripts 204. In some examples, at least one of the database scripts 204 maybe assigned to have, and/or be associated with, a relatively higher prioritization (e.g., a relatively higher priority), so that the at least one of the database scripts 204 is executed before at least one other of the database scripts 204, based on the at least one other of the database scripts 204 having relatively lower prioritization.

Sorting the database scripts 204 can enable any of the database scripts 204 with dependencies to be executed after other database scripts from among the database scripts 204, based on the other database scripts 204 needing to be executed first to satisfy the dependencies and/or to enable successful execution of the database scripts 204 with the dependencies. Database scripts 204 associated with one or more corresponding priority values (e.g., relatively higher priority values) can be sorted to be executed prior to other database scripts 204 with one or more corresponding other priority values (e.g., one or more relatively lower priority values).

In various cases, such as for examples in which the execution includes script orchestration and at least one other action, the at least one other action performed via execution of the automated script engine can include execution of the database scripts 204. Execution of the database scripts 204 can be utilized to process the unprocessed data (e.g., the raw data) in the raw data database 216.

Processing of the raw data can include identifying, receiving, and/or retrieving unprocessed data (e.g., raw data) and processing the raw data via execution of the database scripts 204 according to the script order information 206. For example, processing the raw data via execution of the database scripts 204 according to the script order information 206 can be performed according to any of the techniques as discussed herein.

In various implementations, utilizing the script order information 206 can include identifying priority information (e.g., priority information associated with the database scripts 204) in the script order information 206. In some examples, a database script 204 with which a relatively higher priority value is associated can be executed prior to a database script 204 with which a relatively lower priority value. In those or other examples, utilizing the script order information 206 can include storing the database scripts 204 in storage device locations (e.g., locations having location identifiers) utilized for setting an order in which the database scripts 204 are executed (e.g., the database scripts 204 can be stored at storage device locations having numerical values as location identifiers, and the database scripts 204 can be executed in order of lowest to highest numerical values of the location identifiers, highest to lowest numerical values of the location identifiers, etc.), or any combination thereof.

In some examples, the scheduling information can include database script identifiers (e.g., database script identifiers associated with the database scripts 204), file identifiers (e.g., file identifiers associated with corresponding files including the database scripts 204), any other type of scheduling information and/or values, or any combination thereof, can be utilized to identify an order for executing the database scripts 204, alternatively or in addition to, the priority values, the storage location identifiers, etc.

In various examples, the database script identifiers can include names of the database scripts 204 utilized to identify the order of script execution (e.g., the names can include numerical values (e.g., numbers), the database scripts 204 being executed according to an increasing order or decreasing order of the numerical values of the names, so that the database scripts 204 with dependencies are executed after execution of others of the database scripts 204 on which the database scripts 204 depend). In various examples, the file identifiers of the files with the database scripts 204 utilized to identify the order of script execution (e.g., the file identifiers can include numerical values, the database scripts 204 being executed according to an increasing order or decreasing order of the numerical values of the file identifiers, so that the database scripts 204 with dependencies are executed after execution of others of the database scripts 204 on which the database scripts 204 depend).

Although various identifiers, such as numerical values, can be utilized to control the order of script execution as discussed above in the current disclosure, it is not limited as such. In some examples, any types of identifiers (e.g., names, symbols, keyed values, alphabetical characters, other characters, numerical characters, etc., or any combination thereof) can be utilized in a similar way as the numerical values to control the order of script execution, based on the automation server 202 including, such as within the script order information 206, information (e.g., a key, a reference table, a set of processing instructions, etc.) utilized to identify the order of the database scripts 204 based on the corresponding identifiers associated with the database scripts 204.

In various examples, identifying, receiving, and/or retrieving the unprocessed data (e.g., the raw data), from the raw data database 216, can be performed according to any of the techniques as discussed herein. The identifying, receiving, and/or retrieving of the raw data can be performed separately from, or as part of, execution of the database scripts 204.

In some examples, execution of the database scripts 204 can include modifying and/or maintaining various portions of the unprocessed data as the processed data. Modifying a portion of the unprocessed data may include scenarios in which an output (e.g., the processed data) of execution of the database scripts 204 is different than an input (e.g., the unprocessed data). Maintaining a portion of the unprocessed data may include scenarios in which an output (e.g., the processed data) of execution of the database scripts 204 is the same as an input (e.g., the unprocessed data). In some examples, any portion of the unprocessed data may be modified, and/or any portion of the unprocessed data may be maintained.

In some examples, the automation server 202 can identify, receive, and/or retrieve (e.g., retrieve by transmitting a query and receiving the raw data) the raw data from and execute the database scripts 204, based on identifying the raw data has been received and/or retrieved, and, alternatively or additionally, based on identifying the raw data has been stored. In alternative examples, the automation server 202 can execute the database scripts 204, and, as part of execution of the database scripts 204, receive and/or retrieve the raw data, as well as store the received and/or retrieved raw data.

In some implementations, the automation server 202 can process the raw data by executing the database scripts 204 according, as discussed above. Execution of the raw data can include modifying the raw data as curated data, transforming into the curated data, generating curated data based on the raw data, and/or routing the raw data from the raw data database 216 (e.g., extracting, based on a raw data storage arrangement (e.g., an arrangement, table, structure, etc., or any combination thereof, utilized to store raw data that has not yet been processed, coded, formatted, and/or analyzed), the raw data from the raw data database 216).

In various implementations, the environment 200 can include a curated data database 220. In some examples, the curated data database 220 can be implemented as any of the processed data database(s) 126, as discussed above with reference to FIG. 1.

In various examples, routing the raw data from the raw data database 216 can include routing, from the raw data database 216, the raw data to the curated data database 220. The raw data can be routed and stored as the curated data in the curated data database 220. In some examples, routing the raw data as curated data being stored in the curated data database 220 can include storing and/or inserting the curated data into the curated data database 220 based on a curated data storage arrangement (e.g., an arrangement, table, structure, etc., or any combination thereof, utilized to store curated data that has not been processed, coded, formatted, and/or analyzed, the data being stored utilizing, for example, nodes and/or edges, such as a table of nodes and edges (e.g., relationships), and/or a collection of node and edge tables) (e.g., nodes can be utilized to update, insert, delete, and/or select the curated data, and/or values and/or portions of the curated data).

In various examples, outputting and/or inserting the processed data (e.g., the curated data), into the curated data database 220, can be performed according to any of the techniques as discussed herein. The outputting and/or inserting of the curated data can be performed separately from, or as part of, execution of the database scripts 204.

In some examples, the automation server 202 can output and/or insert the curated data into the curated data database 220 separately from, and/or subsequent to, at least a portion (e.g., a partial portion or an entire portion) of the execution of any portions (e.g., partial portions or an entire portions) of the database scripts 204 being completed (e.g., after any portion of the curated data becomes available based on execution of at least one of the database scripts 204, the portion of the curated data can be stored via the curated data database 220; alternatively, in some examples, storage of some or all of the curated data can be performed subsequent to completion of execution of all of the database scripts 204).

In those examples, the automation server 202 can output and/or insert the curated data into the curated data database 220 based on identification of the curated data, and/or based on identifying the curated data has been generated, and, alternatively or additionally, based on identifying the curated data has been stored (e.g., temporarily store) in the automation server prior to insertion in the curated data database 220 (e.g., based on identifying the curated data is available to be stored via the curated data database 220). In alternative examples, the automation server 202 can execute the database scripts 204, and, as part of execution of the database scripts 204, output and/or insert the curated data into the curated data database 220.

In various implementations, the environment 100 can include an administrator device 222. In some examples, the administrator device 222 can be implemented as any of the administrator device(s) 128, as discussed above with reference to FIG. 1.

In various examples, the administrator device 222 can be utilized to generate reports 224. The reports 224 can be generated based on the curated data, in a similar way as for generation of the reports based on the processed data, as discussed above with respect to FIG. 1.

In various implementations, generation of the curated reports may be automated (e.g., dynamic, scheduled, triggered, etc.), semi-automated, and/or manual, similar to the automated (e.g., dynamic, scheduled, triggered, etc.), semi-automated, and/or manual processes utilized for generating and/or processing of other types, as discussed above. The generation of the curated reports may be integrated as part of, or performed separately from, execution of the database scripts 204 and/or execution of the script orchestration engine.

For instance, with examples in which the generation of the curated reports is performed separately from execution of the database scripts 204 and/or execution of the script orchestration engine, generation of the curated reports may be triggered by completion of at least a portion (e.g., a partial portion or an entire portion) of execution of the database scripts 204, completion of at least a portion (e.g., a partial portion or an entire portion) of execution of the script orchestration engine, completion of at least a portion (e.g., a partial portion or an entire portion) of identification of the processed data, etc., or any combination thereof. In those or other examples, the generation of the curated reports may be performed automatically (e.g., dynamically, in real-time) in response to the database scripts 204 being executed and/or the processed data being generated.

In some examples, various actions can be performed utilizing the reports. In those or other examples, the actions can be performed in a similar way as the actions being performed by the automated script management server(s) 102, the script provisioning device(s) 124, the administrator device(s) 128, and/or the user device(s) 130, as discussed above with respect to FIG. 1.

For instance, with examples in which at least one action (e.g., at least one system and/or network management action, as discussed above with respect to FIG. 1) is performed (e.g., performed separately) from execution of the database scripts 204 and/or execution of the script orchestration engine, performance of the at least one action may be triggered by completion of at least a portion (e.g., a partial portion or an entire portion) of execution of the database scripts 204, completion of at least a portion (e.g., a partial portion or an entire portion) of execution of the script orchestration engine, completion of at least a portion (e.g., a partial portion or an entire portion) of identification of the processed data, completion of at least a portion (e.g., a partial portion or an entire portion) of generation of the report(s), etc., or any combination thereof. In those or other examples, the generation of the curated reports may be performed automatically (e.g., dynamically, in real-time) in response to the database scripts 204 being executed and/or the processed data being generated.

Although the execution of the script orchestrator, and/or the database scripts 204 being sorted, can be performed via the automated script engine as discussed above in the current disclosure, it is not limited as such. In some examples, any number of devices (e.g., servers), such as one or more devices including the automation server 202 and/or at least one other of various local and/or remote devices (e.g., any of the device(s) in environment 100, as discussed above with reference to FIG. 1), can be utilized to sort the database scripts 204 utilizing any type of software (e.g., database script orchestration software utilized for execution of the automated script engine, as discussed throughout this disclosure), such as by any number of any of the devices executing various types of any number of programs, etc.

Figure 3:
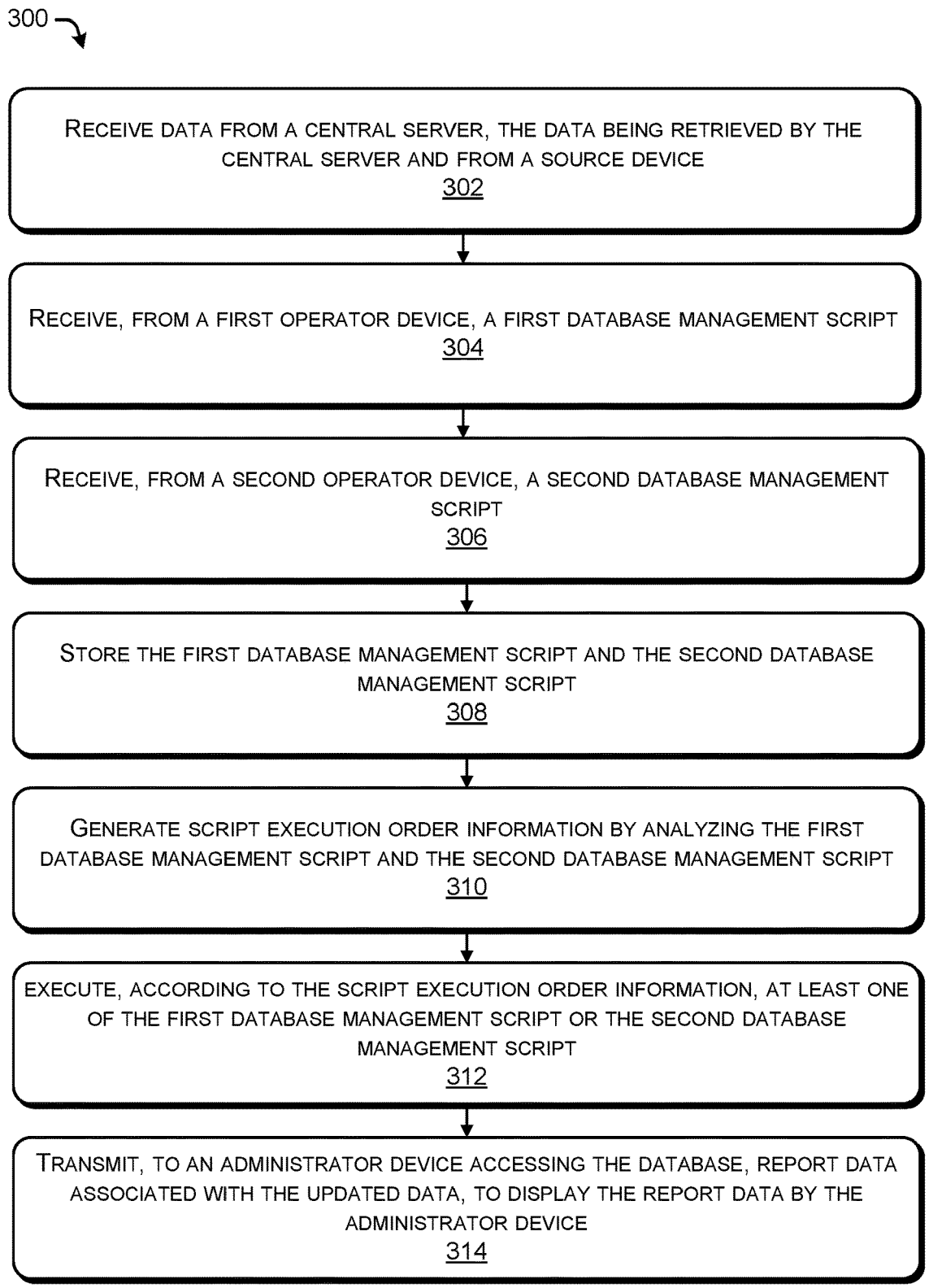
FIG. 3 is a flow diagram of an illustrative process for automated dependency graph builder system and network management.

FIG. 3 is a flow diagram 300 of an illustrative process for automated dependency graph builder management, in accordance with examples of the disclosure.

At operation 302, the process can include receiving data (e.g., unprocessed data) (e.g., raw data) from a central server 120, the data being retrieved by the central server and from a source device (e.g., any of the network node(s) 212, such as any of the base station 108, the AMF 110, the SMF 112, the UPF 114, the PCF 116, the NRF 118, etc.). In some examples, the data can be received via an unprocessed data database (e.g., the raw data database 216). The data can be received by an automation server (e.g., the automation server 202).

At operation 304, the process can include receiving, from a first operator device (e.g., any of the operator devices 218), a first database management script (e.g., any of the database scripts 204). The first database management script 204 can be utilized for managing unprocessed data (e.g., raw data). The first database management script 204 can be received by the automation server 202.

At operation 306, the process can include receiving, from a second operator device (e.g., any of the operator devices 218), a second database management script (e.g., any of the database scripts 204). The second database management script 204 can be utilized for managing the unprocessed data (e.g., the raw data). The second database management script 204 can be received by the automation server 202.

At operation 308, the process can include storing the first database management script and the second database management script. The first database management script 204 and the second database management script 204 can be stored by the automation server 202.

At operation 310, the process can include generating script execution order information by analyzing the first database management script and the second database management script. In some examples, the script execution order information be generated by the automation server 202. In those or other examples, the script execution order information be stored by the automation server 202. The script order information can include dependency information.

In some examples, the dependency information can include a first priority value associated with the first database management script 204 and a second priority value associated with the second database management script 204. The first database management script can be executed by the automation server 202, prior to the second database management script 204. The first database management script can be executed prior to the second database management script based on the first priority value being greater than or equal to the second priority value.

The first priority value may be determined for the first database management script 204 based on at least one pattern (e.g., text pattern, word pattern, syntax pattern, etc.) in the first database management script 204 being associated with a resource which the second database management script 204 utilized to write data. By way of example, the at least one pattern may be associated with a table (e.g., at least one table value) being created and/or modified by the first database management script 204. The first database management script 204 can be associated with a relatively higher priority value to ensure that the table (e.g., at least one table value) is created and/or modified by the first database management script 204 prior to execution of the second database management script 204.

At operation 312, the process can include executing, according to the script execution order information, at least one of the first database management script 204 or the second database management script 204. In various examples, based on the executing of the at least one of the first database management script 204 or the second database management script 204, the data can be at least one of extracted, transformed, or loaded as updated data in a database (e.g., the curated data database 220).

In some examples, execution of the first database management script 204 and/or the second database management script 204 may be performed any number of times. In those or other examples, the execution of the first database management script 204 and/or the second database management script 204 may include a first execution of the first database management script 204 and/or the second database management script 204, and a second execution of the first database management script 204 and/or the second database management script 204.

In various examples, the first execution can be performed utilizing first script order information. Any number of scripts, including, the first database management script 204 and/or the second database management script 204, can be executed based on the first script order information In various examples, the second execution can be performed utilizing second script order information, based on one or more modifications to the first database management script 204, the second database management script 204, at least one other database management script, or any combination thereof. The second script order information may include different dependency information than in the first script order information. Any number of scripts, including, the first database management script 204 and/or the second database management script 204, can be executed based on the second script order information. The scripts being executed based on the second script order information may be executed in a same order or a different order, than the scripts being executed based on the first script order information.

The scripts being executed utilizing the first script order information, the second script order information, and/or any number of additional executions based on one or more additional script order information, can be dynamic, scheduled, triggered, or any combination thereof. For example, the scripts being executed utilizing the second script order information may be dynamic, based on scripts being modified, generated, deleted, etc., based on the automation server 202 identifying at least one of the modification, generation, deletion, etc. of any of at least one of the scrips. In those or other examples, the scripts being executed maybe based on the scheduling information, the triggering information, etc., or any combination thereof.

At operation 314, the process can include transmitting, to an administrator device (e.g., the administrator device 222) accessing the database (e.g., the curated data database 220), report data associated with the updated data, to display the report data by the administrator device 222.

Figure 4:
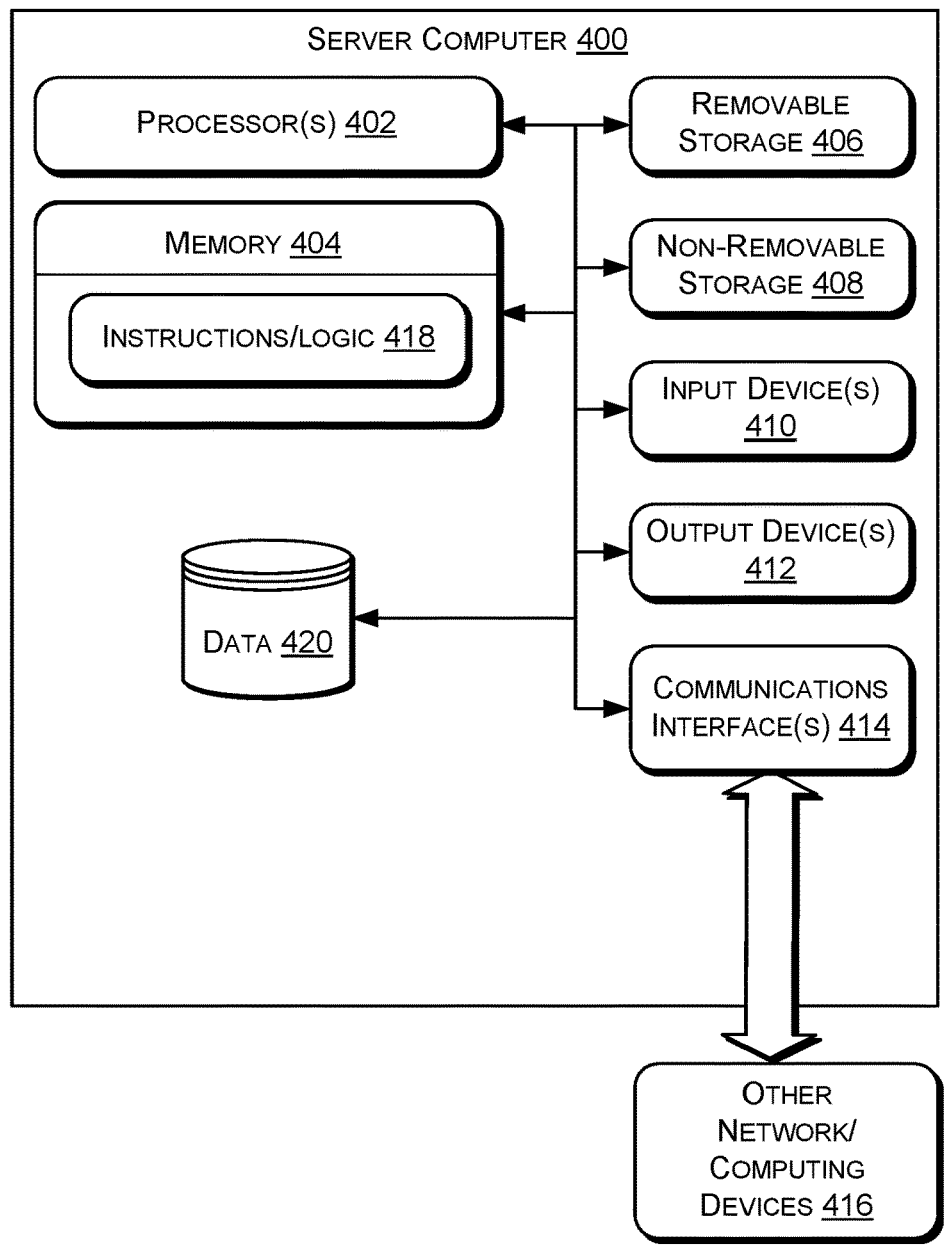
FIG. 4 is a block diagram of an example server computer utilized to implement automated dependency graph builder system and network management.

The report data can be transmitted, by the administrator device 222, to at least one device (e.g., at least one of the administrator device(s) 128, at least one of the user device(s) 130, at least one other device, or any combination thereof). The at least one device receiving the report data can activate, deactivate, reactivate, modify, suspend, unsuspend, update at least one network node, and/or perform any other function (e.g., control at least one cellular service path to be established, modified, etc., control at least one cellular service to be established, modified, etc., and/or control at least one other cellular function to be established, modified, etc.), FIG. 4 is a block diagram of an example server computer utilized to implement automated dependency graph builder system and network management, in accordance with some examples of the present disclosure.

The server computer 400 may be representative of an automated dependency graph builder system (e.g., any of the automated script management server(s) 102, as discussed above with reference to FIG. 1), one or more devices (e.g., any of the script provisioning device(s) 124), one or more other devices and/or systems (e.g., any of the central server(s) 120, any of the administrator device(s) 128, any of the user device(s) 130, etc., as discussed above with reference to FIG. 1), or any combination thereof.

As shown, the server computer 400 may include one or more processors 402 and one or more forms of computer-readable memory 404. The server computer 400 may also include additional storage devices. Such additional storage may include removable storage 406 and/or non-removable storage 408.

The server computer 400 may further include input devices 410 (e.g., a touch screen, keypad, keyboard, mouse, pointer, microphone, etc.) and output devices 412 (e.g., a display, printer, speaker, etc.) communicatively coupled to the processor(s) 402 and the computer-readable memory 404. The server computer 400 may further include communications interface(s) 414 that allow the server computer 400 to communicate with other network and/or computing devices 416 (e.g., any of the automated script management server(s) 102, any of the script provisioning device(s) 124, any of the central server(s) 120, any of the administrator device(s) 128, any of the user device(s) 130, one or more other network and/or computing devices, or any combination thereof) such as via a network. The communications interface(s) 414 may facilitate transmitting and receiving wired and/or wireless signals over any suitable communications/data technology, standard, or protocol, as described herein.

In various embodiments, the computer-readable memory 404 comprises non-transitory computer-readable memory 404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 404 may also be described as computer storage media and may include volatile and nonvolatile, removable and non-removable media implemented in any method or technology for storage of information, such as computer readable instructions, data structures, program modules, or other data. Computer-readable memory 404, removable storage 406 and non-removable storage 408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 400. Any such computer-readable storage media may be part of the server computer 400.

The memory 404 can include logic 418 (i.e., computer-executable instructions that, when executed, by the processor(s) 402, perform the various acts and/or processes disclosed herein) to implement automated dependency graph builder management, according to various examples as discussed herein. For example, the logic 418 is configured to carry out automated script orchestration (e.g., execution of an automated script engine), associated with and the automation server 202. The memory 404 can further be used to store data 420, which may be used to implement automated dependency graph builder management, as discussed herein. In one example, the data 420 may include any type of data (e.g., the unprocessed data, the processed data), any type of information (e.g., the script order information, the scheduling information, the triggering information, etc.), any type of scripts (e.g., the database scripts 204), and so on, or any combination thereof.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:
   retrieving, by a central server and from a telecommunication network, network data associated with at least one network device in the telecommunication network;
   storing, by the central server, the network data in a first database communicatively coupled to the central server;
   obtaining, by an automation server and from the first database, the network data;
   executing, by the automation server, an automated script orchestration engine;
   analyzing, by the automation server and via execution of the automated script orchestration engine, a plurality of database management scripts including a first database management script, a second database management script, and a third database management script;
   generating, by the automation server, script execution order information associated with the plurality of database management scripts, wherein the generating is based on priority information of each of the plurality of database management scripts, wherein the script execution order information indicates a dependency of the second database management script and the third database management script on the first database management script and respective priority information of the second database management script and the third database management script indicates that the second database management script and the third database management script have an equal priority, with a result that the first database management script is executed first and the second database management script and the third database management script are executed second, in parallel;
   executing, by the automation server and according to the script execution order information, the first database management script, the second database management script, and the third database management script, the network data being extracted, transformed, and loaded, as curated data, in a second database based at least in part on execution of the first database management script, the second database management script, and the third database management script;
   transmitting, by the automation server and to a user device accessing the second database, first report data associated with the curated data;
   displaying, by the user device, the first report data;
   transmitting, by the user device and to the telecommunication network, network management data, based at least in part on at least one user selection received via user input to the user device;
   at least one of maintaining, modifying, or deactivating a network device of the at least one network device being identified via the network management data;
   receiving, by the automation server and from the user device, a fourth database management script, the fourth database management script being received as an updated database management script to replace the second database management script;
   dynamically executing, by the automation server and according to the script execution order information, the first database management script and the fourth database management script, wherein additional data is extracted, transformed, and loaded as additional report data in the second database to replace the first report data based at least in part on execution of the first database management script and the fourth database management script, and the execution of the first database management script and the fourth database management script is triggered by the automation server after identifying that the fourth database management script is received; and
   modifying the displaying of the first report data by displaying, by the user device, the additional report data.

2. The method of claim 1, wherein the script execution order information includes dependency information, and the execution includes automated execution of the first database management script and the second database management script based at least in part on the dependency information, the dependency information including a first priority value associated with the first database management script and a second priority value associated with the second database management script, the first database management script being executed prior to the second database management script based at least in part on the first priority value being greater than or equal to the second priority value.

3. The method of claim 1, wherein the script execution order information includes dependency information indicating that at least one log value generated by the first database management script is accessed by the second database management script.

4. The method of claim 1 wherein the script execution order information is associated with log data that is generated by the first database management script and that is at least one of obtained or modified by the second database management script.

5. The method of claim 1, further comprising:
causing, by the user device being communicatively connected to the automation server, the at least one network device in the telecommunication network to be managed based at least in part on the at least one user selection identified via the user input to the user device, the at least one user selection being identified based at least in part on the first report data being received by the user device.

6. The method of claim 1, wherein:
the user device identifies the at least one user selection via user input to the user device based at least in part on the first report data, and
the user device transmits to the at least one network device, a control signal including the network management data, based at least in part on the at least one user selection, the control signal being utilized to at least one of modify or deactivate the at least one network device based at least in part on the first report data indicating the at least one network device is defective.

7. The method of claim 1, wherein the user device automatically generates an error signal, based at least in part on the first report data, the error signal being transmitted to the automation server, and the method further comprises:
automatically generating, by the automation server, a request signal for additional raw data based at least in part on the error signal, the request signal by transmitted by the automation server and to the central server, the additional raw data being retrieved by the central server and from the telecommunication network, the central server storing the additional raw data in the first database.

8. The method of claim 1, wherein the first report data being displayed includes the first report data being presented by a display of the user device, the first report data being presented as updated report data to replace previous report data, the previous report data being previously presented by the display.

9. A first server comprising:
one or more processors; and
non-transitory memory storing computer-executable instructions that, when executed by the one or more processors, cause the one or more processors to perform operations comprising:
receiving data from a second server;
receiving, from a first operator device, a first database management script;
receiving, from a second operator device, a second database management script;
receiving, from a third operator device, a third database management script;
generating first script execution order information by analyzing a plurality of database management scripts including the first database management script, the second database management script, and the third database management script, wherein the generating is based on priority information of each of the database management scripts, the first script execution order information indicates a dependency of the second database management script and the third database management script on the first database management script respective priority information of the second database management script and the third database management script indicates that the second database management script and the third database management script have an equal priority, with a result that the first database management script is executed first and the second database management script and the third database management script are executed second, in parallel;
executing, according to the first script execution order information, the plurality of database management scripts, the data being at least one of extracted, transformed, or loaded as updated data in a database based on execution of the plurality of database management scripts;
transmitting, to an administrator device accessing the database, first report data associated with the updated data, to display the report data by the administrator device;
receiving, from the second operator device, a fourth database management script, the fourth database management script being received as an updated database management script to replace the second database management script;
dynamically executing according to additional script execution order information, the first database management script and the fourth database management script, wherein additional data is extracted, transformed, and loaded as additional report data in the database to replace the first report data based at least in part on execution of the first database management script and the fourth database management script after identifying the fourth database management script being received; and
transmitting, to the administrator device, the additional report data to modify the displaying of the first report data by displaying the additional report data.

10. The first server of claim 9, wherein:
generating the first script execution order information further comprises:
identifying, based on predetermined keyword and syntax information, a portion of the second database management script on which the first database management script depends for successful execution of the first database management script; and
identifying dependency information of the first script execution order information based on the portion of the second database management script, wherein executing the plurality of database management scripts comprises executing the first database management script prior to the second database management script, based on the dependency information; and
the operations further comprise:
causing presentation by the administrator device of the first report data, by transmitting software application data utilized by a program being executed by the administrator device to display the first report data.

11. The first server of claim 9, the operations further comprising:
transmitting an error signal to the second operator device, the second operator device presenting an error notification via a display of the second operator device, wherein the fourth database management script is received as the updated database management script based on at least one user selection received via user input to a user interface (UI) of the second operator device.

12. The first server of claim 9, the operations further comprising:
identifying an error value associated with the generating of the first script execution order information, the error value being associated with an absence, in the plurality of database management scripts, of a fifth database management script, based on the fifth database management script being identified in a list of database management scripts scheduled for execution; and
transmitting an error signal to a fourth operator device, the fourth operator device presenting an error notification via a display of the fourth operator device.

13. The first server of claim 9, the operations further comprising:
identifying, based on language pattern and syntax dependency information, that successful execution of the second database management script and the third database management script relies on prior execution of the first database management script;
identifying an error value indicating an absence of the first database management script;
transmitting an automated message to the first operator device to request the first database management script; and
receiving, from the first operator device, the first database management script.

14. The first server of claim 9, wherein:
the first script execution order information includes a first priority value associated with the first database management script, and a second priority value associated with the second database management script, the first priority value being generated based on execution of the first database management script being utilized to write at least one data value into a table, the second priority value being generated based on execution of the second database management script being utilized to at least one of identify or modify the at least one data value in the table, and
the first script execution order information is used to control the first database management script to be executed prior to the second database management script, based on the first priority value being greater than or equal to the second priority value.

15. The first server of claim 9, the operations further comprising:
transmitting, by the administrator device and to a user device, the first report data associated with the updated data;
identifying, by the user device, at least one user selection via user input to the user device based at least in part on the first report data; and
transmitting, by the user device and to at least one network node, a control signal, based at least in part on the first report data, the control signal being utilized to at least one of modify or deactivate the at least one network node based at least in part on the first report data indicating the at least one network node is defective.

16. A system comprising:
one or more processors; and
non-transitory memory storing computer-executable instructions that, when executed by the one or more processors, cause the one or more processors to perform operations comprising:
storing data in a first database;
generating script execution order information utilized to execute a plurality of database management scripts including a first database management script, a second database management script, and a third database management script, wherein the generating is based on priority information of each of the plurality of database management scripts, wherein the script execution order information indicates a dependency of the second database management script and the third database management script on the first database management script and respective priority information of the second database management script and the third database management script indicates that the second database management script and the third database management script have an equal priority, with a result that the first database management script is executed first and the second database management script and the third database management script are executed second, in parallel;
executing, according to the script execution order information, the first database management script, the second database management script, and the third database management script to at least one of extract, transform, or load the data, as updated data, in a second database;
transmitting, to a user device, first report data associated with the updated data, the first report data being presented by a display of the user device based on the user device identifying reception of the first report data;
receiving a fourth database management script, the fourth database management script being received as an updated database management script to replace the second database management script;
dynamically executing according to the script execution order information, the first database management script and the fourth database management script, wherein additional data is extracted, transformed, and loaded as additional report data in the second database to replace the first report data based at least in part on execution of the first database management script and the fourth database management script after identifying the fourth database management script being received; and
transmitting, to the user device, the additional report data to modify the displaying of the first report data by displaying the additional report data.

17. The system of claim 16, the operations further comprising:
identifying that execution of the first database management script is utilized to generate a table and write at least one data value into the table, and that execution of the second database management script is utilized to at least one of identify or modify the at least one data value, wherein:
the script execution order information includes dependency information, the dependency information including a first priority value associated with the first database management script, and a second priority value associated with the second database management script, and the first priority value is set to be greater than or equal to the second priority value, based on the execution of the first database management script being utilized to generate the table and write the at least one data value into the table, and the execution of the second database management script being utilized to at least one of identify or modify the at least one data value.

18. The system of claim 16, wherein the script execution order information includes a first priority value associated with the first database management script, and a second priority value associated with the second database management script, and the first priority value is set to be greater than or equal to the second priority value, based on successful execution of the second database management script requiring prior execution of the first database management script.

19. The system of claim 16, wherein the script execution order information includes a first priority value associated with the first database management script, and a second priority value associated with the second database management script, and the first priority value is set to be greater than or equal to the second priority value, based on execution of the first database management script being utilized to access at least one parameter value, and execution of the second database management script being utilized to access the at least one parameter value, the at least one parameter value being associated with at least one site in a cellular network and at least one cell in the cellular network.

* * * * *